United States Patent
Zhang et al.

(10) Patent No.: US 11,651,477 B2
(45) Date of Patent: May 16, 2023

(54) GENERATING AN IMAGE MASK FOR A DIGITAL IMAGE BY UTILIZING A MULTI-BRANCH MASKING PIPELINE WITH NEURAL NETWORKS

(71) Applicant: Adobe Inc., San Jose, CA (US)

(72) Inventors: He Zhang, San Jose, CA (US); Seyed Morteza Safdarnejad, San Jose, CA (US); Yilin Wang, San Jose, CA (US); Zijun Wei, San Jose, CA (US); Jianming Zhang, Campbell, CA (US); Salil Tambe, San Jose, CA (US); Brian Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 208 days.

(21) Appl. No.: 16/988,055

(22) Filed: Aug. 7, 2020

(65) Prior Publication Data
US 2022/0044366 A1     Feb. 10, 2022

(51) Int. Cl.
*G06T 5/00* (2006.01)
*G06T 7/194* (2017.01)
(Continued)

(52) U.S. Cl.
CPC .......... *G06T 5/004* (2013.01); *G06N 3/08* (2013.01); *G06T 3/4046* (2013.01); *G06T 7/194* (2017.01);
(Continued)

(58) Field of Classification Search
None
See application file for complete search history.

(56) References Cited

U.S. PATENT DOCUMENTS

| 6,771,803 B1* | 8/2004 | Turek ..................... G06T 7/12 |
| | | 382/173 |
| 2018/0060701 A1* | 3/2018 | Krishnamurthy .... G06K 9/6273 |

(Continued)

FOREIGN PATENT DOCUMENTS

CN     111223106 A     6/2020

OTHER PUBLICATIONS

Yagiz Aksoy, Tae-Hyun Oh, Sylvain Paris, Marc Pollefeys, and Wojciech Matusik. Semantic soft segmentation. ACM Transactions on Graphics (TOG), 37(4):1-13, 2018.
(Continued)

*Primary Examiner* — Jiangeng Sun
(74) *Attorney, Agent, or Firm* — Keller Preece PLLC

(57) ABSTRACT

Methods, systems, and non-transitory computer readable storage media are disclosed for utilizing a plurality of neural networks in a multi-branch pipeline to generate image masks for digital images. Specifically, the disclosed system can classify a digital image as a portrait or a non-portrait image. Based on classifying a portrait image, the disclosed system can utilize separate neural networks to generate a first mask portion for a portion of the digital image including a defined boundary region and a second mask portion for a portion of the digital image including a blended boundary region. The disclosed system can generate the mask portion for the blended boundary region by utilizing a trimap generation neural network to automatically generate a trimap segmentation including the blended boundary region. The disclosed system can then merge the first mask portion and the second mask portion to generate an image mask for the digital image.

20 Claims, 14 Drawing Sheets

(51) Int. Cl.
  *G06N 3/08* (2023.01)
  *G06T 3/40* (2006.01)
(52) U.S. Cl.
  CPC .............. *G06T 2207/20081* (2013.01); *G06T 2207/20084* (2013.01); *G06T 2207/20132* (2013.01)

(56) References Cited

U.S. PATENT DOCUMENTS

| | | | |
|---|---|---|---|
| 2019/0057507 A1* | 2/2019 | El-Khamy | G06T 5/20 |
| 2019/0251401 A1* | 8/2019 | Shechtman | G06V 30/19173 |
| 2020/0175729 A1 | 6/2020 | Lee et al. | |
| 2020/0175730 A1* | 6/2020 | Brown | A61B 6/035 |
| 2020/0218961 A1 | 7/2020 | Kanazawa et al. | |
| 2020/0327334 A1 | 10/2020 | Goren et al. | |
| 2021/0042928 A1 | 2/2021 | Takeda et al. | |
| 2021/0150681 A1* | 5/2021 | Sytnik | G06T 5/30 |
| 2021/0150682 A1* | 5/2021 | Sytnik | G06T 11/60 |
| 2021/0166400 A1 | 6/2021 | Goel et al. | |

OTHER PUBLICATIONS

Md Amirul Islam, Mahmoud Kalash, and Neil DB Bruce. Revisiting salient object detection Simultaneous detection, ranking, and subitizing of multiple salient objects. In Proceedings of the IEEE Conference on Computer Vision and Pattern Recognition, pp. 7142-7150, 2018.

Qifeng Chen, Dingzeyu Li, and Chi-Keung Tang. Knn matting. IEEE transactions on pattern analysis and machine intelligence, 35(9):2175-2188, 2013.

Quan Chen, Tiezheng Ge, Yanyu Xu, Zhiqiang Zhang, Xinxin Yang, and Kun Gai. Semantic human matting. In 2018 ACM Multimedia Conference on Multimedia Conference, pp. 618-626. ACM, 2018.

Ming-Ming Cheng, Niloy J Mitra, Xiaolei Huang, Philip HS Torr, and Shi-Min Hu. Global contrast based salient region detection. IEEE Transactions on Pattern Analysis and Machine Intelligence, 37(3):569-582, 2015.

Yung-Yu Chuang, Brian Curless, David H Salesin, and Richard Szeliski. A bayesian approach to digital matting. In Proceedings of the 2001 IEEE Computer Society Conference on Computer Vision and Pattern Recognition. CVPR 2001, vol. 2, pages II-II. IEEE, 2001.

Kaiming He, Jian Sun, and Xiaoou Tang. Guided image filtering. In European conference on computer vision, pp. 1-14. Springer, 2010.

Qiqi Hou and Feng Liu. Context-aware image matting for simultaneous foreground and alpha estimation. In Proceedings of the IEEE International Conference on Computer Vision, pp. 4130-4139, 2019.

Philip Lee and Ying Wu. Nonlocal matting. In CVPR 2011, pp. 2193-2200. IEEE, 2011.

Anat Levin, Dani Lischinski, and Yair Weiss. A closed-form solution to natural image matting. IEEE transactions on pattern analysis and machine intelligence, 30(2):228-242, 2008.

Anat Levin, Alex Rav-Acha, and Dani Lischinski. Spectral matting. IEEE transactions on pattern analysis and machine intelligence, 30(10):1699-1712, 2008.

Hao Lu, Yutong Dai, Chunhua Shen, and Songcen Xu. Indices matter: Learning to index for deep image matting. In Proceedings of the IEEE International Conference on Computer Vision, pp. 3266-3275, 2019.

Ehsan Shahrian, Deepu Rajan, Brian Price, and Scott Cohen. Improving image matting using comprehensive sampling sets. In Proceedings of the IEEE Conference on Computer Vision and Pattern Recognition, pp. 636-643, 2013.

Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.

Xiaoyong Shen, Xin Tao, Hongyun Gao, Chao Zhou, and Jiaya Jia. Deep automatic portrait matting. In European Conference on Computer Vision, pp. 92-107. Springer, 2016.

Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.

Ning Xu, Brian Price, Scott Cohen, and Thomas Huang. Deep image matting. In Proceedings of the IEEE Conference on Computer Vision and Pattern Recognition, pp. 2970-2979, 2017.

Jianming Zhang and Stan Sclaroff. Saliency detection: A boolean map approach. In Proceedings of the IEEE international conference on computer vision, pp. 153-160, 2013.

Yunke Zhang, Lixue Gong, Lubin Fan, Peiran Ren, Qixing Huang, Hujun Bao, and Weiwei Xu. A late fusion cnn for digital matting. In Proceedings of the IEEE Conference on Computer Vision and Pattern Recognition, pp. 7469-7478, 2019.

Wu, Xian, et al. "JMNet: A joint matting network for automatic human matting." Computational Visual Media 6.2 (2020): 215-224. (Year: 2020).

Cai, Shaofan, et al. "Disentangled Image Matting." 2019 IEEE/CVF International Conference on Computer Vision (ICCV). IEEE. (Year: 2019).

Henry, Chris, and Sang-Woong Lee. "Automatic trimap generation and artifact reduction in alpha matte using unknown region detection." Expert Systems with Applications 133 (2019): 242-259. (Year: 2019).

Hu, Guanging, and James Clark. "Instance segmentation based semantic matting for compositing applications." 2019 16th Conference on Computer and Robot Vision (CRV). IEEE, 2019. (Year: 2019).

Qian, Bin, and Xiguang Gu. "Automatic ID Photos Matting Based on Improved CNN." 2019 18th International Symposium on Distributed Computing and Applications for Business Engineering and Science (DCABES). IEEE, 2019. (Year: 2019).

Shen, Xiaoyong, et al. "Deep automatic portrait matting." European conference on computer vision. Springer, Cham, 2016. (Year: 2016)

U.S. Appl. No. 16/988,036, dated Feb. 11, 2022, Preinterview 1st Office Action.

U.S. Appl. No. 16/988,036, dated Mar. 23, 2022, Notice of Allowance.

* cited by examiner

608 — Fig. 6E
610 — Fig. 6F
612 — Fig. 6G
614 — Fig. 6H
616 — Fig. 6I

Final Image Mask (Input Resolution)

618

GENERATING AN IMAGE MASK FOR A DIGITAL IMAGE BY UTILIZING A MULTI-BRANCH MASKING PIPELINE WITH NEURAL NETWORKS

BACKGROUND

Improvements to computer processing technologies have led to significant advancements in the field of image processing. For example, computer processing speeds and resources have provided may different types of systems the ability to detect content of digital images and manipulate digital images in a variety of computing environments. To illustrate, systems use image processing to generate digital image masks based on content of digital images/video, which can be used to modify digital images/video for photo editing/touch-up, entertainment (e.g., movies, TV shows, video), advertising media, or augmented/virtual reality environments.

Detecting objects and object boundaries in digital images, however, can be a difficult task. Specifically, conventional systems that utilize object detection to generate image masks for various image/object editing operations lack accuracy and efficiency. For example, some existing systems generate trimap segmentations and corresponding image masks based on excessive user interactions with graphical user interfaces. This approach of tracking a large volume of interactions with user interfaces is time consuming and computationally inefficient. Furthermore, without accurate labeling, the conventional systems often produce image masks with low or varying quality results.

Additionally, conventional systems typically utilize a single technique for generating image masks from digital images. Limiting image mask generation from digital images to a single technique, regardless of the content of the digital images, can result in inaccurate image masks for certain types of objects. For instance, while a given technique may be able to accurately generate image masks for certain types of content, the same technique may provide poor accuracy in generating image masks for other types of content. Thus, the conventional systems also lack flexibility, because the conventional systems are typically useful for only specific object types.

SUMMARY

One or more embodiments provide benefits and/or solve one or more of the foregoing or other problems in the art with systems, methods, and non-transitory computer readable storage media that generate image masks for digital images. Specifically, in some embodiments, the disclosed systems utilize a multi-branch pipeline to generate an image mask for a digital image based on a type of object identified in the digital image. For example, the disclosed systems classify the digital image as a portrait image a non-portrait image based on whether a detected object in the digital image portrays a person or a non-person object, respectively. The disclosed systems then generate an image mask by utilizing a first mask generation branch in response to classifying the digital image as a portrait image, or a second mask generation branch in response to classifying the digital image as a non-portrait image. Furthermore, within the first mask generation branch, the disclosed systems also separately process defined boundary regions and blended boundary regions of the digital image by utilizing separate neural networks. In some embodiments, the disclosed systems generate a final image mask in the second mask generation branch by merging image mask portions based on the defined boundary regions and the blended boundary regions.

In one or more additional embodiments, the disclosed systems also utilize a neural network to automatically determine a trimap segmentation of a digital image. For instance, within the mask generation branch involving a blended boundary region, the disclosed systems generate a trimap segmentation without manual labeling of the digital image. For example, the disclosed systems estimate a foreground region portraying an object in the digital image and a background region of the digital image. In one or more embodiments, the disclosed systems utilize a neural network to determine (e.g., predict) a blended boundary region including a combination of foreground elements and background elements. The disclosed systems automatically determine the trimap segmentation by combining the estimated foreground region, the estimated background region, and the blended boundary region. In some embodiments, the disclosed systems then generate the image mask based on the automatically generated trimap segmentation.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which:

FIGS. 6A-6J illustrate images, image masks, and detected image regions utilized in generating an image mask for a digital image in accordance with one or more implementations;

DETAILED DESCRIPTION

Figure 1:
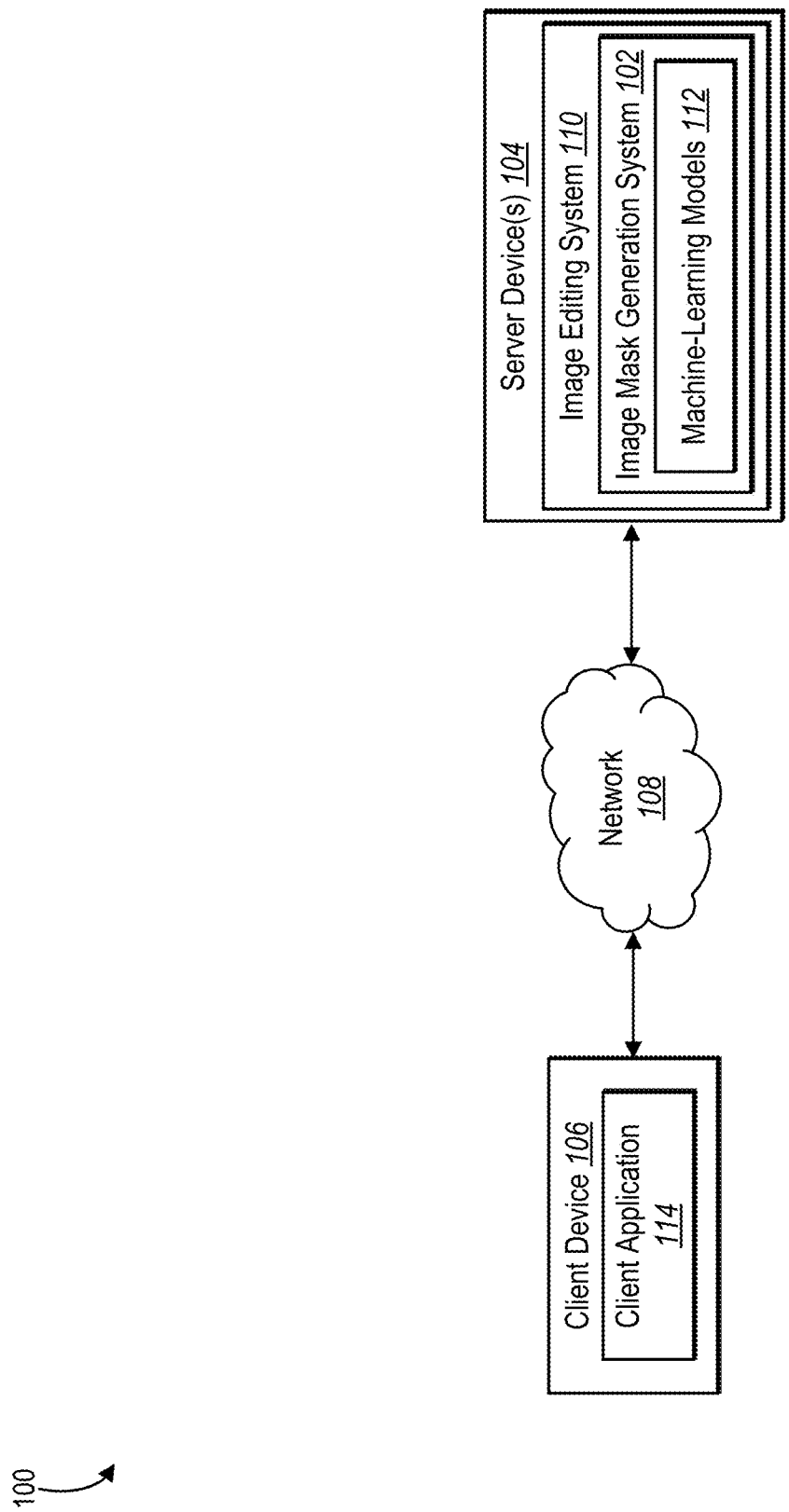
FIG. 1 illustrates an example system environment in which an image mask generation system operates in accordance with one or more implementations.

One or more embodiments of the present disclosure include an image mask generation system (or "mask generation system") that utilizes one or more neural networks in a multi-branch pipeline to generate image masks for digital images. For instance, the mask generation system utilizes a classifier to filter digital images into branches of a mask generation pipeline based on object types portrayed in the digital images. In one or more embodiments, the mask generation system then utilizes different neural networks in the different branches of the mask generation pipeline to generate image masks for the digital images based on the content of the digital images (e.g., based on digital images including person objects or non-person objects). Additionally, for digital images including blended (or soft) boundary regions (e.g., hair, fur, or other soft boundary features), the mask generation system processes the blended boundary regions separately from defined (or hard) boundary regions separately. For example, the mask generation system then combines separately generated image mask portions for blended and defined boundary regions into a single image mask for a digital image.

Additionally, in one or more embodiments, the mask generation system utilizes automatic trimap generation to generate image masks for digital images that include soft boundaries. To illustrate, in response to determining that a digital image includes a soft boundary, the mask generation system utilizes a neural network to determine a predicted region that includes a blended boundary region. In some embodiments, the mask generation system automatically generates a trimap segmentation based on the predicted region by combining the blended boundary region with estimated foreground and estimated background regions. Moreover, in one or more embodiments, the mask generation system utilizes the automatically generated trimap segmentation to generate an image mask that accurately captures the object boundary including the blended boundary region.

As mentioned, in some embodiments the mask generation system utilizes a multi-branch pipeline to generate image masks for digital images. For instance, the mask generation system filters a digital image into one of the branches of the pipeline by utilizing an object classifier. To illustrate, the mask generation system utilizes the object classifier to determine whether the digital image portrays any person objects or non-person objects. In response to determining that the digital image does not include a person, the object classifier classifies the digital image as a non-portrait image and filter the digital image into a first branch. In response to determining that the digital image includes a person, the object classifier classifies the digital image as a portrait image and filter the digital image into a second branch.

After classifying a digital image as a portrait image, in one or more embodiments, the mask generation system utilizes a plurality of neural networks to separately process portions of the digital image. Specifically, the mask generation system processes well-defined boundary regions between an object in a foreground of the digital image and a background of the digital image via a first neural network. The mask generation system also processes blended boundary regions (e.g., soft boundaries such as hair or fur) via a second neural network. In some embodiments, the mask generation system combines the resulting mask portions generated by the first neural network and the second neural network to generate a final image mask.

In one or more embodiments, the mask generation system utilizes a semantic cropping neural network to isolate portions of a digital image that include an object. For example, the semantic cropping neural network generates one or more cropped digital images that include a defined boundary of the object and/or a blended boundary between the object based on an estimated foreground and an estimated background of the digital image. The mask generation system then provides the one or more cropped digital images to the first neural network and the second neural network to generate separate mask portions for the separate boundary regions (e.g., the defined boundary region and the blended boundary region).

For instance, the mask generation system processes a defined boundary region by utilizing a neural network that includes a plurality of layers to generate a first mask portion corresponding to the defined boundary region. In one or more embodiments, the first neural network for generating the second mask portion includes a masking model to generate an initial image mask based on an estimated foreground region and an estimated background region. Additionally, the first neural network includes a refinement layer to refine the boundary of the initial image mask. In one or more embodiments, the first neural network further includes a post-processing layer to apply a guided image filter and curve-fitting model to the initial image mask to generate a mask portion for the defined boundary region.

Furthermore, in some implementations the mask generation system also processes a blended boundary region by utilizing a second neural network that includes a plurality of layers to generate a second mask portion corresponding to the blended boundary region. According to one or more embodiments, the second neural network for generating the second mask portion includes a trimap generation neural network to generate a trimap segmentation including the blended boundary region, an estimated foreground region, and an estimated background region. In some embodiments, the second neural network also includes a matting model to generate an initial image mask based on the trimap segmentation. Furthermore, the second neural network includes a post-processing layer to apply a guided image filter to the initial image mask to generate a mask portion for the blended boundary region.

As previously noted, in some implementations the mask generation system also automatically generates a trimap segmentation for a digital image by utilizing a neural network. Specifically, the trimap generation neural network determines a predicted blended boundary region indicating a portion of the digital image that corresponds to a soft boundary between a foreground object and a background of the digital image. In one or more embodiments, the trimap segmentation neural network combines the predicted blended boundary region with an estimated foreground region and an estimated background region to generate the trimap segmentation. Thus, the trimap segmentation neural network generates the trimap segmentation automatically (e.g., without human annotations for the digital image to indicate the blended boundary region).

After generating mask portions for a defined boundary region and a blended boundary region of a digital image, in some embodiments the mask generation system generates a final image mask. For instance, the mask generation system merges the separate mask portions into a single image mask that includes boundary details corresponding to the defined boundary region and the blended boundary region. Upon generating the final image mask for the defined boundary region and the blended boundary region based on one or more cropped portions of the original digital image, the mask generation system then generates a final image mask for the full digital image based on a position of the cropped digital image relative to the original digital image.

The disclosed mask generation system provides a number of technical advantages over conventional systems. For example, in some embodiments, the mask generation system improves the flexibility and accuracy relative to conventional systems that generate image masks of digital images. To illustrate, while some conventional systems utilize a single technique to generate image masks for a variety of digital images, in some implementations the mask generation system more flexibly generate image masks using different techniques based on the content of digital images. Indeed, by utilizing a multi-branch pipeline that uses different neural networks to generate image masks according to the specific type of content of digital images, the mask generation system more accurately generates image masks for a variety of different digital images. For instance, the mask generation system selects different neural networks to process digital images based on whether the digital images include person or non-person objects.

Additionally, the mask generation system can improve the accuracy relative to conventional systems by utilizing different neural networks based on different boundaries between foregrounds and backgrounds of digital images. In particular, in contrast to conventional systems that utilize a single technique to generate an image mask for a digital image, in some embodiments the mask generation system more accurately generates an image mask for a digital image by separately processing defined boundary regions and blended boundary regions. For example, by utilizing separate neural networks to generate separate image mask portions for defined boundary regions and blended boundary regions of a digital image, the mask generation system generates a complete image mask that accurately represents each of the individual boundary regions in the digital image.

Furthermore, the mask generation system can improve the efficiency relative to conventional systems by automatically generating trimap segmentations for digital images. As previously mentioned, conventional systems that use trimap segmentations to generate image masks require excessive interactions via graphical user interfaces. By utilizing a neural network to predict a blended boundary region corresponding to a soft boundary between an object and a background of a digital image, the mask generation system automatically generates a trimap segmentation. Thus, in one or more embodiments the mask generation system more efficiently generates digital images by eliminating a significant amount of time required to generate an image mask. In addition, as described in greater detail below, in one or more embodiments the mask generation system dynamically crops and modifies digital image resolutions at various stages of the pipeline to reduce computational overhead while still generating accurate image masks.

As illustrated by the foregoing discussion, the present disclosure utilizes a variety of terms to describe features and advantages of the mask generation system. Additional detail is now provided regarding examples of such terms. For example, a digital image includes a computer-representation of visual content. In one or more embodiments, a digital image includes, but is not limited to, a digital photograph, a digital video frame, a computer-generated image, or a digitally scanned image.

Additionally, in one or more embodiments, an object includes a visually distinct component of an image. For instance, an object includes an element displayed within a digital image that is separated from one or more other elements of the digital image by a visual boundary. In some embodiments, an object includes a real-world object that is visually distinguishable from one or more other real-world objects in a digital image. To illustrate, an object can include a person (or a portion of a person) or a non-person object (or a portion of a non-person object).

Furthermore, a foreground region includes an area of a digital image that corresponds to one or more objects in the digital image. For example, a foreground region corresponds to pixels of a digital image portraying an object nearest to an observer of the digital image. To illustrate, a foreground region corresponds to a visible surface of an object of a digital image nearest to an image capture device that captures the digital image. Alternatively, a foreground region corresponds to a selected object or an object of focus in a digital image.

In one or more embodiments, a background region includes an area of a digital image outside of a foreground region. For instance, a background region includes an area visibly farther away from an object associated with a foreground region of a digital image. Thus, a background region includes, but is not limited to, pixels portraying objects and portions of a digital image that are not in focus or that are not closest to an observer of the digital image.

According to one or more embodiments, an image mask includes a digital object that identifies foreground and/or background regions of a digital image. For example, an image mask can include a binary image including zero and non-zero values that correspond to portions of a digital image. For example, an image mask can include non-zero values (e.g., displayed as white pixels) to represent a foreground region of a digital image and zero values (e.g., displayed as black pixels) to represent a background region of a digital image. In one or more embodiments, an image editing system utilizes an image mask to apply specific image processes to portions of a digital image without applying the image processes to other portions of the digital image according to the zero and non-zero values assigned to each pixel in the image mask. An image mask can take a variety of forms (in addition to or in the alternative to a binary image) such as a digital matrix, digital array, or a digital boundary that divides foreground or background regions.

Additionally, a blended boundary region includes a portion of digital image at a boundary between a foreground region and a background region in which the portion includes both foreground elements and background elements. For example, a blended boundary region includes pixels of a digital image that combine foreground and background colors from the digital image. To illustrate, a portion of a digital image that includes hair or fur often includes color pixels that are a blended combinations of foreground (e.g., hair or fur color) and background (e.g., the color of vegetation in the background). Accordingly, an image mask generated based on a blended boundary region can include an alpha channel with alpha values assigned to pixels within the blended boundary region to indicate an opacity (or blending amount) of each pixel within the blended boundary region.

In one or more embodiments, a trimap segmentation includes a partition of a digital image into a foreground region, a background region, and a blended boundary region. In particular, a trimap segmentation includes a plurality of pixels associated with a defined foreground region that corresponds to a portion of the digital image portraying an object, a plurality of pixels associated with a defined background region corresponding to a portion of the digital image outside the object, and a plurality of pixels associated with a portion of the digital image that includes both foreground and background elements. Thus, a trimap segmentation includes a visualization of each region using different colors or display values such as black (e.g., for a background region), white (e.g, for a foreground region), and gray (e.g., for a blended boundary region).

Furthermore, a machine-learning model (e.g., a neural network, decision tree, or support vector machine) includes a computer representation that can be tuned (e.g., trained) based on inputs to approximate unknown functions. For instance, a neural network includes one or more layers or artificial neurons that approximate unknown functions by analyzing known data at different levels of abstraction. In some embodiments, a machine-learning model includes one or more neural networks or neural network layers including, but not limited to, a convolutional neural network, a recurrent neural network, a generative adversarial neural network, a variational auto-encoder, a feed forward neural network, or a graph neural network. In one or more embodiments, a neural network includes, but is not limited to, a semantic cropping neural network to perform object recognition and image cropping/resizing, a masking model to generate image masks from digital images, a refinement model to refine an image mask, a matting model to generate an image mask from a digital image and a trimap segmentation, an object classifier to classify digital images based on content of the digital images, or a trimap generation neural network to automatically generate trimap segmentations of digital images.

Additional detail will now be provided regarding the mask generation system in relation to illustrative figures portraying exemplary implementations. To illustrate, FIG. 1 includes an embodiment of a system environment 100 in which an image mask generation system 102 (also referred to as a "mask generation system 102") operates. In particular, the system environment 100 includes server device(s) 104 and a client device 106 in communication via a network 108. Moreover, as shown, the server device(s) 104 include an image editing system 110, which includes the mask generation system 102. The mask generation system 102 further includes a machine-learning model 112. Additionally, the client device 106 includes a client application 114.

As shown in FIG. 1, the server device(s) 104 includes or hosts the image editing system 110. Specifically, the image editing system 110 includes, or is part of, one or more systems that implement displaying and editing digital images in one or more environments. For example, the image editing system 110 provides tools for viewing, generating, editing, and/or otherwise interacting with digital images. In one or more embodiments, the image editing system 110 uses the digital images in a variety of applications such as databases of digital media assets, digital video presentations, digital advertisements, virtual or augmented reality environments, or other environments that utilize digital images (including digital video). In one or more embodiments, the image editing system 110 provides modified digital images to another system such as a system/application at the client device 106 or to a third-party system.

In connection with providing tools for interacting with digital images, the image editing system 110 utilizes the mask generation system 102 to generate image masks for digital images. For example, the image editing system 110 obtains a digital image from the client device 106 or from another system (e.g., a database of digital images). The image editing system 110 then uses the mask generation system 102 to generate an image mask for the digital image based on content in the digital image. After generating the image mask, the image editing system 110 provides the image mask to the client device 106 (e.g., for display within the client application 114) via the network 108. By automatically generating the image mask using the mask generation system 102, the image editing system 110 provides tools for quickly and easily applying image editing operations to specific portions of the digital image based on the image mask.

In one or more embodiments, the mask generation system 102 includes the machine-learning model 112, which utilizes a plurality of neural networks to generate image masks of digital images based on the content of the digital images. For example, the machine-learning model 112 classifies digital images based on whether the digital images include people or non-person objects. The machine-learning model then generates image masks for the digital images by utilizing neural networks with different layers for optimally generating image masks based on the object types in the digital images.

Furthermore, for digital images including a person, the mask generation system 102 utilizes a multi-branch process that processes defined boundary regions and blended boundary regions differently. To illustrate, the machine-learning model 112 includes at least a first neural network to generate a first mask portion corresponding to a defined boundary region of a digital image and a second neural network to generate at least a second mask portion corresponding to a blended boundary region of a digital image. The mask generation system 102 then merges the first and second mask portions to generate a final image mask for the digital image.

In one or more embodiments, the server device(s) 104 include a variety of computing devices, including those described below with reference to FIG. 10. For example, the server device(s) 104 includes one or more servers for storing and processing data associated with digital images. In some embodiments, the server device(s) 104 also include a plurality of computing devices in communication with each other, such as in a distributed storage environment. Furthermore, in some embodiments, the server device(s) 104 include devices and/or components in connection with one or more machine-learning models (e.g., the machine-learning model 112) and training data for training the machine-learning model(s) (e.g., for learning parameters of neural network layers in the machine-learning model 112). In some embodiments, the server device(s) 104 include a content server. The server device(s) 104 can also include an application server, a communication server, a web-hosting server, a social networking server, a digital content campaign server, or a digital communication management server.

As mentioned, the server device(s) 104 include components associated with neural networks and training data for training one or more neural networks. In one or more embodiments, the server device(s) 104 (e.g., the mask generation system 102 or another system) train neural network layers of the machine-learning model 112. For example, the server device(s) 104 also trains the neural network layers using previously generated or labeled training data such as digital images with labeled boundary regions, objects, trimap segmentations, etc. In addition to utilizing one or more training datasets, the server device(s)

104 can utilize a verification dataset and a testing dataset for verifying and testing training of the neural network layers, respectively.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). The client device 106 also performs functions for generating, capturing, or accessing data to provide to the image editing system 110 and the mask generation system 102 in connection with digital images and image masks. For example, the client device 106 communicates with the server device(s) 104 via the network 108 to provide information associated with a digital image and to receive an image mask for a digital image. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the mask generation system 102 communicate and/or interact via other methods (e.g., the server device(s) 104 and the client device 106 can communicate directly). Furthermore, although FIG. 1 illustrates the mask generation system 102 being implemented by a particular component and/or device within the system environment 100, the mask generation system 102 can be implemented, in whole or in part, by other computing devices and/or components in the system environment 100 (e.g., the client device 106). Additionally, the machine-learning model 112 may be implemented at the server device(s) 104 or at one or more other server devices or systems.

Figure 2:
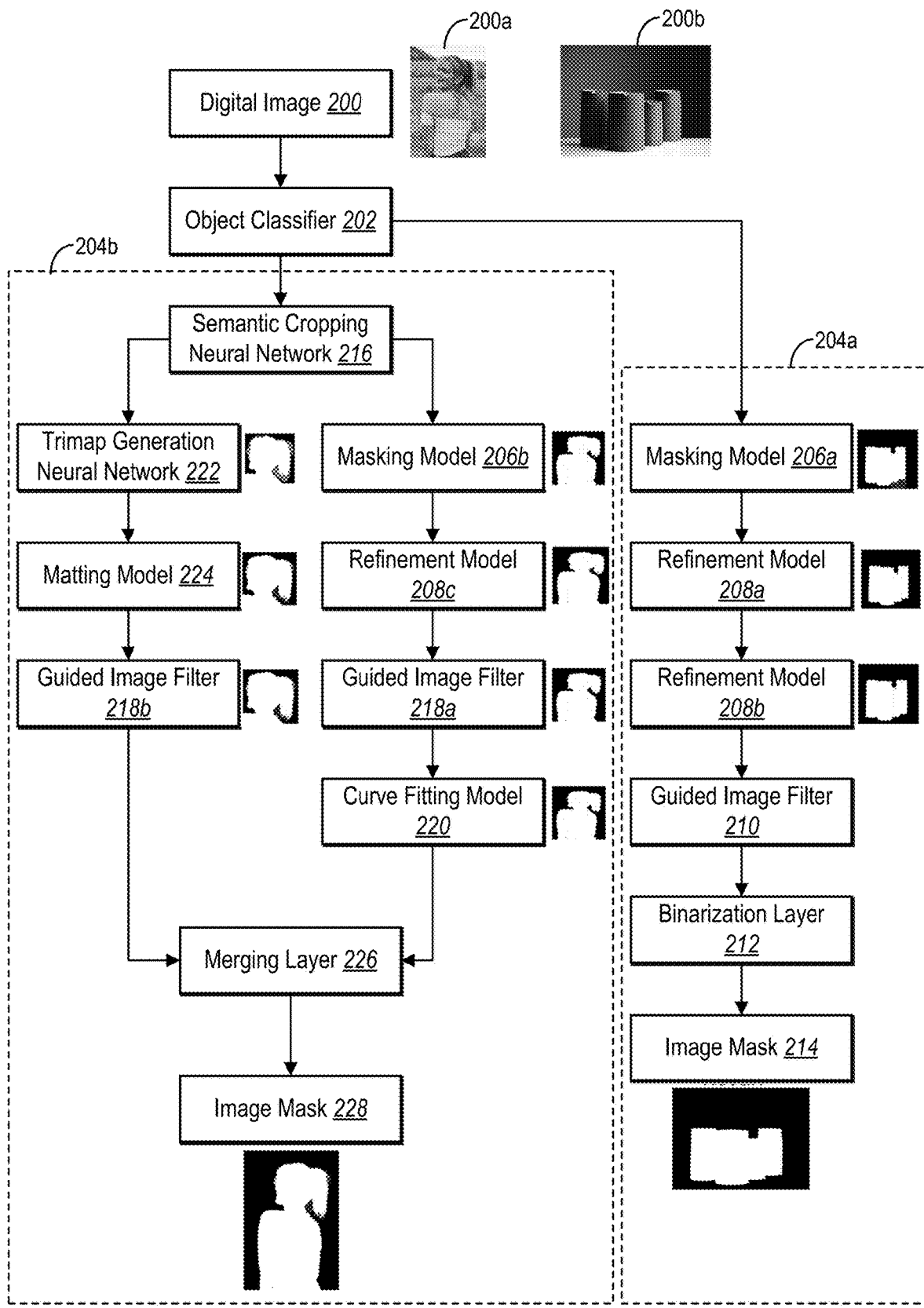
FIG. 2 illustrates a diagram of a multi-branch pipeline including an object classifier for generating image masks for digital images in accordance with one or more implementations.

As mentioned above, the mask generation system 102 accurately and efficiently generates image masks for digital images via a multi-branch pipeline with a plurality of different neural networks. FIG. 2 illustrates an embodiment of a multi-branch pipeline for generating image masks of digital images based on the content of the digital images in accordance with one or more embodiments. Specifically, FIG. 2 illustrates that the mask generation system 102 first classifies a digital image based on the content of the digital image. FIG. 2 also illustrates that the mask generation system 102 then processes the digital image by utilizing different neural networks in accordance with the content of the digital image. Processing digital images based on the content results in optimized image masks with greater efficiency due to processing content using neural networks with parameters learned based on the specific content types.

For example, FIG. 2 illustrates that the mask generation system 102 receives (or otherwise identifies) a digital image 200 to generate an image mask. FIG. 2 further illustrates that the digital image 200 can include a first digital image 200a that portrays a person or a second digital image 200b that portrays non-person objects. In some embodiments, the digital image 200 includes a digital image formatted for processing by the mask generation system 102. To illustrate, a format of the digital image 200 includes, but is not limited to, one of JPEG, TIFF, RAW, bitmap, or PNG formats. In some embodiments, the digital image 200 includes a video frame from a digital video. In additional embodiments, the digital image 200 includes one of a plurality of digital images received by the mask generation system 102 to generate a plurality of image masks.

In response to receiving the digital image 200, the mask generation system 102 classifies the digital image 200 based on the content of the digital image 200. For instance, FIG. 2 illustrates that the mask generation system 102 utilizes an object classifier 202 to classify the digital image 200. In some embodiments, the object classifier 202 classifies the digital image 200 based on whether the digital image 200 includes a person or a non-person object. More specifically, the object classifier 202 classifies the digital image 200 as a portrait image (e.g., the digital image 200 includes a person) or a non-portrait image (e.g., the digital image 200 includes a non-person object). In alternative embodiments, the object classifier 202 classifies the digital image 200 based on whether a recognized object in the digital image includes at least one soft boundary between the object and a background of the digital image. Thus, in the alternative embodiments, the object classifier 202 classifies digital images as soft-object images (e.g., images with soft boundaries) or hard-object images (e.g., images without soft boundaries).

In some cases, digital image 200 includes more than one object. To classify the digital image 200, the mask generation system 102 utilizes the object classifier 202 into a classification based on a specific object in the digital image 200. For example, the mask generation system 102 selects the object based on a manual user selection of the object. Alternatively, the mask generation system 102 automatically selects the object based on various visual characteristics, such as whether the object is nearest an observer viewpoint, how close the object is to the center of the digital image, in response to the object being in focus, or other indicators that the object is a relevant object. In one or more embodiments, the mask generation system 102 determines the performance of the object classifier 202 by training the object classifier 202 on a plurality of digital images, as described in more detail below with respect to FIG. 4.

In some embodiments, the mask generation system 102 also classifies a digital image based on a plurality of objects in the digital image. To illustrate, the mask generation system 102 classifies a digital image into a specific category based on a detected group of objects. For example, the mask generation system 102 determines that at least two objects are near each other within the digital image and are part of a consistent foreground region. Alternatively, the mask generation system 102 classifies the digital image in response to a specifically labeled group of objects. To classify the digital image based on the group of objects, the object classifier 202 classifies the digital image as a non-portrait image in response to determining that none of the objects in the group of objects is a person. Otherwise, if at least one of the objects is a person, the object classifier 202 classifies the digital image as a portrait image.

In some embodiments, the object classifier 202 can divide a digital image into multiple digital images based on different objects being portrayed in the digital image. For instance, the mask generation system 102 can crop a first portion of a digital image that portrays a person (and utilize a first branch of the pipeline to analyze this first portion) and crop a second portion of a digital image that portrays a non-person object (and utilize a second branch of the pipeline to analyze this second portion).

FIG. 2 illustrates that, in response to classifying the digital image 200 (e.g., the second digital image 200b) as a non-portrait image, the mask generation system 102 provides the digital image 200 to a first branch 204a. The mask generation system 102 utilizes the first branch 204a to generate image masks for digital images including non-person objects. In particular, the first branch 204a includes a plurality of layers for determining different regions of a digital image, refining the regions of the digital image, and generating an image mask based on the refined regions.

For example, as shown in FIG. 2, the first branch 204a includes a first layer including a masking model 206a. In one or more embodiments, the masking model 206a receives, as an input, the second digital image 200b. The masking model 206a then generates an initial image mask based on the second digital image 200b to indicate a foreground region associated with one or more objects detected in the second digital image 200b. According to one or more embodiments, the masking model 206a includes a convolutional neural network as described in U.S. Pat. No. 10,614,574 to Jianming Zhang, which is herein incorporated by reference in its entirety. For example, in one or more embodiments, the masking model 206a includes a first branch to generate a feature map of high-level image features and a second branch to generate a feature map of low-level image features. The masking model 206a can combine the feature maps of the high-level image features and the low-level image features and then generate an image mask from the combined feature map. Additionally, in some embodiments, the mask generation system 102 trains the masking model 206a in the first branch 204a to generate image masks for digital images including non-person objects.

FIG. 2 also illustrates that the first branch 204a includes a plurality of refinement models (e.g., a first refinement model 208a followed by a second refinement model 208b). The mask generation system 102 utilizes the refinement models to improve a quality of the initial image mask generated by the masking model 206a. For example, the refinement models successively refines details along a boundary of the detected foreground region (e.g., the boundary between the objects in the second digital image 200b and the background), such as by sharpening the boundary and/or otherwise reducing fuzziness of the boundary. In one or more embodiments, the mask generation system 102 utilizes one or more refinement models that perform refinement of a segmentation mask, as described in U.S. patent application Ser. No. 16/574,513 to Jianming Zhang and Zhe Lin, which is herein incorporated by reference in its entirety. For instance, in one or more embodiments, the refinement models utilize an iterative process to refine the image mask based on coarse segmentation data. Specifically, according to one or more embodiments, the refinement models correct at least a portion of type I and type II segmentation errors and refine boundaries of an object within the segmentation data. Furthermore, in some embodiments, the mask generation system 102 trains the refinement models to refine image masks corresponding to non-person objects.

As shown in FIG. 2, the first branch 204a also includes additional layers for post-processing the initial image mask. In one or more embodiments, the mask generation system 102 utilizes a guided image filter 210 after the refinement models to further enhance details of the image mask based on the second digital image 200b. More specifically, the mask generation system 102 provides the second digital image 200b to the guided image filter 210 in conjunction with the second digital image 200b to guide the enhancement of the refined image mask according to details in the second digital image 200b. For example, the mask generation system 102 uses a guided image filter as described by Kaiming He, Jian Sun, and Xiaoou Tang in "Guided image filtering" in IEEE transactions on pattern analysis and machine intelligence, 2013 (referred to herein as "Kaiming"). To illustrate, in one or more embodiments, the guided image filter 210 computes a filtering output based on the content of a guidance image to transfer the structures of the guidance image to the filtering output. The guided image filter 210 can utilize edge-preserving filtering and gradient preserving filtering to preserve edges and color details from the original image in the image mask.

Additionally, FIG. 2 illustrates that the mask generation system 102 utilizes a binarization layer 212 to generate the image mask 214 for the second digital image 202b. Specifically, the binarization layer assigns each pixel in the image mask 214 output by the first branch 204a a value corresponding to a foreground region or a background region. Thus, the resulting image mask 214 includes a black-and-white image representing the foreground region and the background region determined based on the second digital image 200b using the plurality of layers in the first branch 204a.

FIG. 2 further illustrates that, in response to classifying the digital image 200 (e.g., the first digital image 200a) as a portrait image, the mask generation system 102 provides the digital image 200 to a second branch 204b. The mask generation system 102 utilizes the second branch 204b to generate image masks of digital images that portray people. In particular, the second branch 204b includes a plurality of layers for determining different portions of a digital image including defined boundary regions and blended boundary regions between a foreground (e.g., an object) and a background. The second branch 204b also includes separate neural networks (e.g., separate groups of neural network layers) to process the defined boundary regions and blended boundary regions to generate separate mask portions. Finally, the second branch 204 merges the mask portions to generate a final image mask for a digital image.

As mentioned, the mask generation system 102 determines different portions of a digital image corresponding to an object. Specifically, FIG. 2 illustrates that the mask generation system 102 includes a semantic cropping neural network 216 to automatically detect one or more portions of the first digital image 200a that include one or more objects. For example, the semantic cropping neural network 216 detects features of a digital image and determines boundaries of one or more objects based on the detected features.

According to one or more embodiments, the semantic cropping neural network 216 determines separate portions of a digital image by performing salient object recognition utilizing a convolutional neural network as described in U.S. patent application Ser. No. 15/967,928 to Pao et al., which is herein incorporated by reference in its entirety. For example, in one or more embodiments, the semantic cropping neural network 216 iteratively applies the convolutional neural network to a digital image at a reduced resolution to automatically identify pixels of salient objects portrayed within the digital image. The semantic cropping neural network 216 can also utilize intelligent post-processing operations to analyze low resolution selections and high-resolution digital images to determine an accurate selection of pixels at the original resolution of the digital image. Additionally, in some embodiments, the semantic cropping neural network 216 automatically crops the first digital image 200a to one or more identified portions that include the defined boundary regions and the blended boundary regions.

After identifying separate regions of the first digital image 200b, the mask generation system 102 utilizes a first neural network to generate a mask portion corresponding to a defined boundary region. For instance, FIG. 2 illustrates that the mask generation system 102 utilizes a masking model 206b to generate an initial image mask for a defined boundary region from the second digital image 200b. In one or more embodiments, the masking model 206b includes a convolutional neural network, as described in previously cited U.S. Pat. No. 10,614,574 or in U.S. patent application Ser. No. 15/784,918. For example, in one or more embodiments, the masking model 206b includes a first branch to generate a feature map of high-level image features and a second branch to generate a feature map of low-level image features. The masking model 206b then combines the feature maps of the high-level image features and the low-level image features and generates an image mask from the combined feature map. In one or more embodiments, the mask generation system 102 trains the masking model 206b to predict defined boundary regions in portrait images.

Furthermore, for example, the neural network for generating a mask portion corresponding to a defined boundary region includes a refinement model 208c. In one or more embodiments, the refinement model 208c includes a model as cited previously in U.S. patent application Ser. No. 16/574,513. For instance, in one or more embodiments, the refinement model 208c utilizes an iterative process to refine the image mask based on coarse segmentation data. According to one or more embodiments, the refinement model 208c corrects at least a portion of type I and type II segmentation errors and refines boundaries of an object within the segmentation data. In one or more embodiments, the refinement model 208c refines predicted boundaries between a foreground region and a background region by sharpening or otherwise removing fuzziness from the defined boundary region. According to one or more embodiments, the mask generation system 102 trains the refinement model 208c to refine image masks corresponding to hard boundaries of people in portrait images.

Following the refinement process from the refinement model 208c, FIG. 2 illustrates that the mask generation system 102 utilizes a guided image filter 218a with a curve-fitting model 220 to perform additional post-processing on the initial image mask and generate a mask portion for the defined boundary region. Specifically, the mask generation system 102 utilizes a guided image filter, as described in Kaiming, to ensure that the boundary of the refined initial image mask lines up with details of the first digital image 200a. The mask generation system 102 utilizes the curve-fitting model 220 to generate a smooth curve along the boundary in the initial image mask for the defined boundary region and remove possible fuzzy boundary details introduced by the guided image filter 218a.

In conjunction with generating a mask portion for the defined boundary region of the first digital image 200a, the mask generation system 102 also generates a mask portion for a blended boundary region. In particular, in response to determining that the first digital image 200a includes one or more portions corresponding to salient objects (e.g., by utilizing the semantic cropping neural network 216), the mask generation system 102 feeds the corresponding portion (s) of the first digital image 200a into a neural network for generating a mask portion corresponding to blended boundary regions. The mask generation system 102 processes a hard boundary and a soft boundary separately to optimize each portion of the resulting image mask according to the content of the digital image and advantages of the separate neural network layers.

For example, FIG. 2 illustrates that the mask generation system 102 utilizes a trimap generation neural network 222 to automatically generate a trimap segmentation for the first digital image 200a. In one or more embodiments, the trimap generation neural network 222 utilizes a portion of the first digital image 200a to predict a blended boundary region corresponding to a soft boundary between an object in the first digital image 200a and a background. In one example, the soft boundary corresponds to a boundary between hair of a person in the first digital image 200a and a background of the first digital image 200a. In other examples, a soft boundary corresponds to a boundary between fur of an animal, branches/needles of a tree, or another material that includes small texture details that at least partially blend with a background. Additionally, the trimap generation neural network 222 utilizes the predicted blended boundary region to generate a trimap segmentation for the portion of the first digital image 200a including the blended boundary region.

Based on the trimap segmentation generated by the trimap generation neural network 222, the mask generation system 102 determines an initial image mask for the first digital image 200a. For example, FIG. 2 illustrates that the mask generation system 102 includes a matting model 224 to generate an initial image mask from the trimap segmentation. The matting model 224 utilizes the trimap segmentation to predict an alpha matte for the predicted blended boundary region to use in combination with a foreground region and a background region from the trimap segmentation. The matting model 224 thus processes the trimap segmentation with a portion of the first digital image 200a to generate the initial image mask for the blended boundary region. In one or more embodiments, the matting model 224 utilizes a neural network as described in U.S. Pat. No. 10,255,681 to Price et al., which is herein incorporated by reference in its entirety. For example, in one or more embodiments, the matting model 224 utilizes a deep neural network to predict the alpha matte from the trimap segmentation automatically generated from the first digital image 200a by the trimap generation neural network 222. Specifically, the matting model 224 utilizes the information from the trimap generation including the estimated foreground region, the predicted blended boundary region, and the estimated background region to predict the alpha matte according to the first digital image 200a.

Additionally, FIG. 2 illustrates that the mask generation system utilizes a guided image filter 218b to further process details of the initial image mask. Specifically, the guided image filter 218b uses the first digital image 200a as a guidance image to preserve edges of the original boundary from the first digital image 200a in the initial image mask. In some embodiments, the guided image filter 218b includes a filter as described in Kaiming. The guided image filter 218b generates a mask portion corresponding to the blended boundary region.

After generating mask portions corresponding to a defined boundary region and a blended boundary region of a digital image, the mask generation system 102 then generates a final image mask. For example, as illustrated in FIG. 2, the mask generation system 102 includes a merging layer 226 to combine the mask portion corresponding to the defined boundary region of the first digital image 200a and the mask portion corresponding to the blended boundary region of the first digital image 200a to generate the image mask 228. In one or more embodiments, the mask generation system 102 also combines the image mask 228 with an image mask corresponding to the first digital image 200a as a whole. To illustrate, the mask generation system 102 inserts the image mask 228 into the overall image mask based on the position of the cropped portion(s) of the digital image relative to the first digital image 200a.

Although FIG. 2 and the accompanying description provide one or more specific embodiments for the neural network or machine-learning layers to perform operations for object detection and image cropping, image mask generation, trimap segmentation generation, image mask refinement, image matting, and image filtering, one or more embodiments of the mask generation system 102 utilize other neural networks, machine-learning models, and image mask generation techniques. For example, in some embodiments, one or more layers utilize convolutional neural networks, feedforward neural networks, deep neural networks, decision trees, classification algorithms, or generative adversarial networks. Furthermore, the mask generation system 102 can utilize a combination of neural networks for each operation, or combine a plurality of operations into a single neural network. Additionally, in various embodiments, the mask generation system 102 trains the neural networks jointly or separately.

Figure 3:
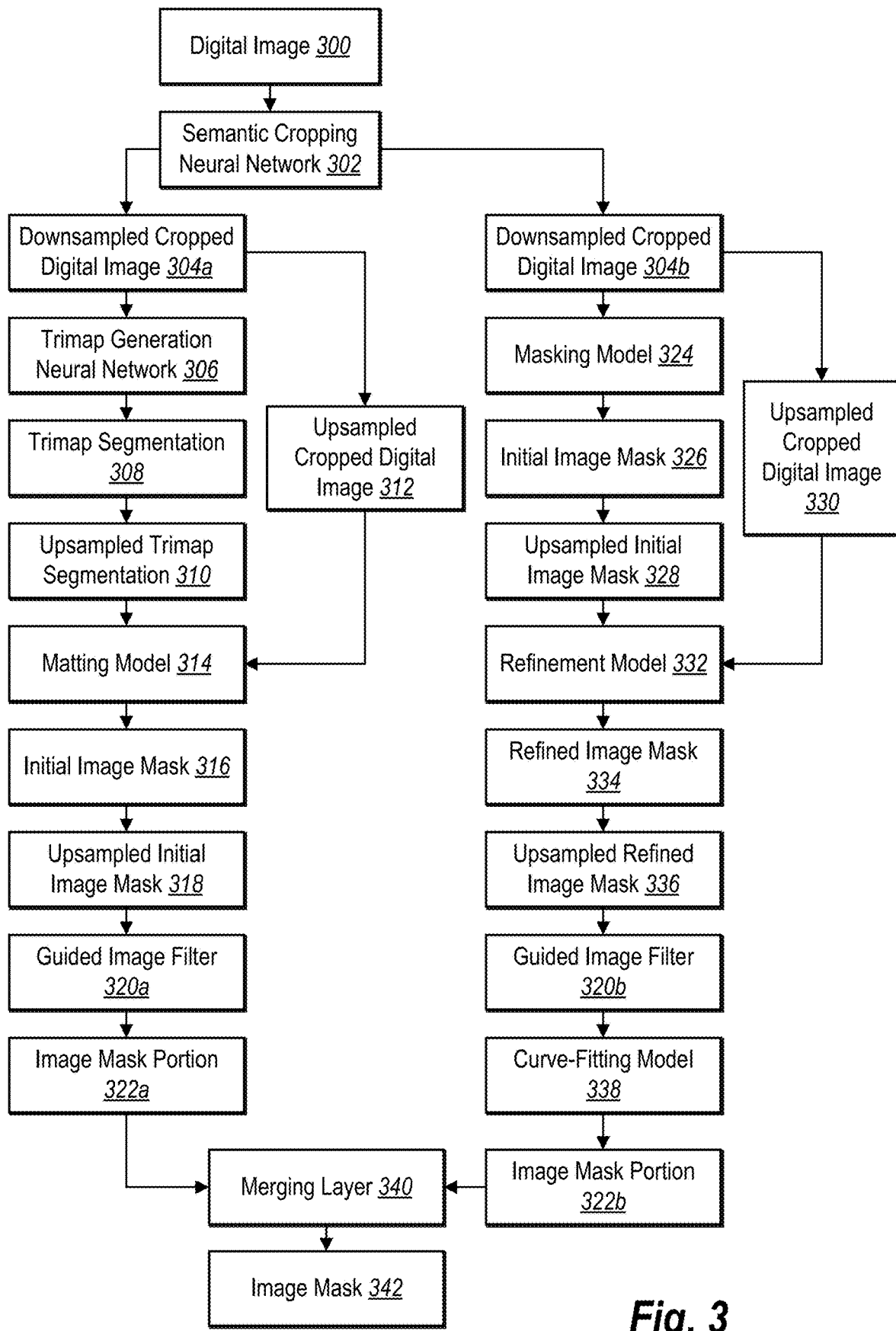
FIG. 3 illustrates a diagram of generating an image mask by utilizing separate neural networks to generate separate image mask portions for defined boundary regions and blended boundary regions of a digital image in accordance with one or more implementations.

FIG. 3 illustrates additional detail associated with generating an image mask for a digital image by using separate neural networks to process separate portions of the digital image. As previously mentioned, in response to classifying a digital image 300 as a portrait image (or a soft-object image), the mask generation system 102 utilizes a semantic cropping neural network 302 to crop one or more portions of the digital image 300 based an object in the digital image 300. For instance, as previously described, the digital image may include a person that the semantic cropping neural network 302 detects.

Additionally, in one or more embodiments, the semantic cropping neural network 302 identifies one or more boundary regions within the digital image in connection with detecting the object. In particular, the semantic cropping neural network 302 detects at least one salient object within the digital image 300 via object recognition. For example, the semantic cropping neural network 302 detects a person within the digital image 300. The semantic cropping neural network 302 identifies the object based on a detected boundary of the object, a shape of the object, colors associated with the object, or other visual characteristics indicative of the object.

In one or more embodiments, the semantic cropping neural network 302 also determines a portion of the digital image 300 that includes the object based on a boundary of the object and crops the digital image to the portion including the object. To illustrate, the semantic cropping neural network 302 automatically identifies an outer boundary of the object in the digital image 300 and select dimensions for cropping around the outer boundary of the object. The semantic cropping neural network 302 thus generates one or more cropped digital images based on the selected dimensions.

In one or more embodiments, the semantic cropping neural network 302 further crops the digital image 300 based on the boundary of the object. For instance, the semantic cropping neural network 302 detects at least one salient object in the digital image 300 using object detection. The semantic cropping neural network 302 then generates at least one cropped digital image 300 corresponding to one or more portions of the digital image 300 including the salient object(s). In some embodiments, the mask generation system 102 generates a separate cropped digital image for each portion of the digital image including an object. In other embodiments, the mask generation system 102 generates a single cropped digital image including a plurality of salient objects.

Additionally, in one or more embodiments, the mask generation system 102 (e.g., the semantic cropping neural network 302 or another component) generates a downsampled version of the one or more cropped digital images. For example, FIG. 3 illustrates that the mask generation system 102 generates a first downsampled cropped digital image 304a to provide to a first neural network for generating a mask portion based on a blended boundary region. The mask generation system 102 also generates a second downsampled cropped digital image 304b for providing to a second neural network for generating a mask portion based on a defined boundary region. In some embodiments, in addition to downsampling the cropped digital image(s), the mask generation system 102 modifies an aspect ratio of the one or more cropped digital image(s), such as by setting the aspect ratio to 1:1 (e.g., in a 320×320 resolution image).

Additionally, in one or more embodiments, the mask generation system 102 provides the first downsampled cropped digital image 304a to a first neural network layer for generating an image mask for a soft region of the digital image 300. FIG. 3 illustrates that the first neural network layer includes a trimap generation neural network 306 to automatically generate a trimap segmentation 308 for the portion of the digital image 300. In particular, the trimap generation neural network 306 processes the downsampled cropped digital image 304a to estimate a foreground region and a background region of the downsampled cropped digital image 304a. In one or more embodiments, the trimap generation neural network 306 estimates the foreground region and the background region based on object data from the semantic cropping neural network 302. In alternative embodiments, the trimap generation neural network 306 estimates the foreground region and the background region by determining portions of the downsampled cropped digital image 304a that belong to the foreground/background regions with high confidence.

Furthermore, the trimap generation neural network 306 generates a predicted blended boundary region corresponding to an object in the downsampled cropped digital image 304a. For instance, the trimap generation neural network 306 generates the predicted blended boundary region by predicting one or more portions of the downsampled cropped digital image 304a that include both foreground and background elements. Specifically, the predicted blended boundary region includes visual information (e.g., colors) that corresponds to both the foreground (e.g., an object in the digital image 300) and the background (e.g., objects or scene elements behind the object in the digital image 300). In one or more embodiments, the trimap generation neural network 306 thus predicts the blended boundary region by determining pixels along a boundary region that include visual information corresponding to both foreground elements and background elements. In other words, the trimap generation neural network 306 predicts the blended boundary region by determining pixels of the downsampled cropped digital image 304a corresponding to a foreground region that have at least some transparency.

FIG. 3 illustrates that after predicting the blended boundary region from the downsampled cropped digital image 304a, the mask generation system 102 generates the trimap segmentation 308. Specifically, the mask generation system 102 combines the predicted blended boundary region with the estimated foreground region and the estimated background region. For example, as illustrated in more detail below with respect to FIGS. 6E-6I, the mask generation system 102 generates a trimap segmentation of the downsampled cropped digital image 304a that includes pixel values representing an estimated background region (e.g., black pixel values), pixel values representing an estimated foreground region (e.g., white pixel values), and pixel values representing a blended boundary region (e.g., gray pixels). Additionally, in one or more embodiments, the trimap segmentation 308 includes the blended boundary region to indicate pixels for which the mask generation system 102 generates alpha values based on at least some transparency associated with the pixels (e.g., indicating a blending of foreground and background elements). In some embodiments, prior to generating the trimap segmentation, the mask generation system 102 crops an output of the trimap generation neural network 306 to the predicted blended boundary region to increase a size of details of the predicted blended boundary region.

In one or more embodiments, the mask generation system 102 utilizes the trimap segmentation to generate an initial image mask for the portion of the digital image 300 including the blended boundary region. For example, the mask generation system 102 increases the dimensions of the trimap segmentation and the downsampled cropped digital image. FIG. 3 illustrates that the mask generation system 102 generates an upsampled trimap segmentation 310 and an upsampled cropped digital image 312. To illustrate, the mask generation system 102 upsamples the trimap segmentation 308 to a predetermined resolution size. Additionally, the mask generation system 102 increases the resolution of the downsampled cropped digital image to the predetermined resolution size of the upsampled trimap segmentation 310.

In at least some embodiments, the mask generation system 102 then utilizes a matting model 314 to generate the initial image mask. In particular, the matting model 314 processes the upsampled trimap segmentation 310 and the upsampled cropped digital image 312 to generate the initial image mask. For example, the matting model 314 utilizes a neural network to estimate the initial image mask by estimating the per-pixel opacity of the foreground regions of the upsampled cropped digital image 312 based on the information in the upsampled trimap segmentation 310. According to some embodiments, the matting model 314 includes a neural network described in U.S. Pat. No. 10,255,681, as previously described. In one or more embodiments, the matting model 314 utilizes a deep neural network to predict the alpha matte from the upsampled trimap segmentation 310 and the upsampled cropped digital image 312. Specifically, the matting model 314 utilizes the information from the upsampled trimap segmentation 310 including an estimated foreground region, the blended boundary region, and an estimated background region to predict the alpha matte according to the upsampled cropped digital image 312. In at least some embodiments, the predetermined resolution size corresponds to a resolution size of digital images that the mask generation system 102 uses to learn parameters of the matting model 314.

More specifically, the matting model 314 analyzes the upsampled cropped digital image 312 to determine alpha values for each pixel located in the blended boundary region within the upsampled trimap segmentation 310—which includes the blended boundary region predicted by the trimap generation neural network 306. The matting model 314 thus generates an initial image mask 316 that includes masking information including the foreground region, the background region, and the blended boundary region with alpha values indicating the opacity of the corresponding pixels. The alpha matte includes opacity values of the pixels in the blended boundary region to accurately combine the foreground elements and the background elements in the corresponding pixels.

In one or more embodiments, the matting model 314 generates the initial image mask according to a matting algorithm:

$$I=\alpha*F+(1-\alpha)*B, \alpha \in [0,1],$$

where I represents the input digital image, a represents the alpha matte, F represents the foreground region of the digital image, and B represents the background region of the digital image. The matting model 314 solves the matting algorithm for a given the input image according to the trimap segmentation. Specifically, the matting model 314 utilizes the per-pixel color information (e.g., RGB values or other color schema values) from the input image to estimate the unknown α for each pixel. The matting model 314 then combines the alpha values for each pixel of the upsampled trimap segmentation 310 into an alpha matte in the initial image mask 316.

After generating the initial image mask 316 via the matting model 314, the mask generation system 102 performs one or more post-processing operations on the initial image mask 316. In preparation for the post-processing operations, in one or more embodiments, the mask generation system 102 generates an upsampled initial image mask 318 by increasing a resolution size of the initial image mask 316. For example, the mask generation system 102 increases the resolution of the initial image mask 316 to an original resolution associated with the digital image 300. More specifically, the mask generation system 102 increases the resolution of the initial image mask 316 to a size of the corresponding portion in the digital image 300. Thus, if the semantic cropping neural network 302 crops the digital image 300 to a specific portion including a soft boundary of an object of the digital image 300, the mask generation system 102 upsamples the initial image mask 316 to the size of the specific portion including the object.

FIG. 3 illustrates that the mask generation system 102 utilizes a guided image filter 320a to enhance details in the upsampled initial image mask 318 with the digital image 300 as a guidance image. In particular, the mask generation system 102 utilizes the guided image filter 320a to guide the enhancement of the blended boundary region based on the details of the soft boundary in the digital image 300. As noted previously, in one or more embodiments, the mask generation system 102 utilizes a guided image filter as described in Kaiming. In one or more embodiments, the guided image filter 320a utilizes a radius parameter of 5 and an epsilon value of 0.0001 to enhance details of the blended boundary region. In other embodiments, the guided image filter 320a utilizes other radius parameters (e.g., radius greater than or less than 5) or epsilon values (e.g., greater than or less than 0.0001) depending on the resolution of the digital image 300, the size of the blended boundary region, or a target resolution.

After enhancing the details using the guided image filter 320a, the mask generation system 102 generates an image mask portion 322a for the blended boundary region. According to some embodiments, the image mask portion 322a includes enhanced details for the blended boundary region. While the guided image filter 320a provides improved details for the blended boundary region, the mask generation system 102 also includes the second neural network for generating a separate image mask portion (image mask portion 322b) for a defined boundary region of the digital image 300.

As noted previously, the mask generation system 102 generates a downsampled cropped digital image 304b for the second neural network. In one or more embodiments, the mask generation system 102 provides the downsampled cropped digital image 304b to a masking model 324 to generate an initial image mask 326 corresponding to a defined boundary region. Specifically, the masking model 324 includes a convolutional neural network (e.g., as described in U.S. Pat. No. 10,614,574) to generate a segmentation from the downsampled cropped digital image 304b indicating a foreground region and a background region. The masking model 324 utilizes the information about the foreground region and the background region to determine the defined boundary region by identifying boundary details associated with a hard boundary from the digital image 300, which can include a visibly distinguishable boundary between an object and a background of the digital image. The resulting initial image mask 326 thus includes the defined boundary region as determined based on the boundary details associated with the hard boundary from the digital image 300.

FIG. 3 illustrates that the mask generation system 102 prepares the initial image mask 326 for refinement by upsampling the initial image mask 326 to generate an upsampled initial image mask 328. For example, as described in relation to the first neural network, the mask generation system 102 upsamples the initial image mask 326 to a predetermined resolution size. In one or more embodiments, the mask generation system 102 also upsamples the downsampled cropped digital image 304b to the predetermined resolution size to generate an upsampled cropped digital image 330.

Furthermore, FIG. 3 illustrates that the mask generation system 102 utilizes a refinement model 332 to refine details of the upsampled initial image mask 328. For example, as previously described in relation to FIG. 2, the refinement model 332 includes a segmentation mask refinement model as described in U.S. patent application Ser. No. 16/574,513. The refinement model 332 improves detail of hard boundary features (e.g., in the defined boundary region) in the upsampled initial image mask 328 based on pixel information in the upsampled cropped digital image 330 to generate a refined image mask 334. In one or more embodiments, the predetermined resolution size of the upsampled initial image mask 328 and the upsampled cropped digital image 330 corresponds to a resolution size of digital images that the mask generation system 102 uses to learn parameters of the refinement model 332.

After applying the refinement model 332 to the upsampled initial image mask 328, the mask generation system 102 upsamples the refined image mask 334 to generate an upsampled refined image mask 336. Specifically, in preparation for post-processing operations on the refined image mask 334, the mask generation system 102 increases the resolution size of the refined image mask 334 to an original resolution associated with the digital image 300. More specifically, the mask generation system 102 increases the resolution of the refined image mask 334 to a size of a corresponding portion in the digital image 300. Thus, if the semantic cropping neural network 302 crops the digital image 300 to a specific portion corresponding to a hard boundary of an object in the digital image 300, the mask generation system 102 upsamples the refined image mask 334 to the size of the specific portion corresponding to the hard boundary of the object.

FIG. 3 illustrates that the mask generation system 102 then utilizes a guided image filter 320b to enhance details in the upsampled refined image mask 336 with the digital image 300 as a guidance image. In particular, the mask generation system 102 utilizes the guided image filter 320b (e.g., as described in Kaiming) to guide the enhancement of the defined boundary region based on the details of the hard boundary in the digital image 300. In one or more embodiments, the guided image filter utilizes a radius parameter of 5 and an epsilon value of 0.0001 to enhance details of the blended boundary region, though the guided image filter 320b may utilize other radius parameters or epsilon values, as may serve a particular implementation.

FIG. 3 illustrates that the mask generation system 102 utilizes a curve-fitting model 338 to apply a curve-fitting algorithm on top of the guided image filter 320b. In one or more embodiments, the mask generation system 102 utilizes the curve-fitting model 338 to smooth a boundary corresponding to the defined boundary region. For example, when enhancing details of the upsampled refined image mask 336 according to the guidance image, the guided image filter 320b may introduce fuzziness into portions of the boundary. The curve-fitting model 338 can reduce or remove the fuzziness in the boundary by fitting the boundary to one or more curves. After fitting the boundary to one or more curves using the curve-fitting model 338, the mask generation system 102 generates an image mask portion 322b corresponding to the defined boundary region.

According to one or more embodiments, the image mask portion 322a corresponding to the blended boundary region optimizes an image segmentation for soft boundary of the digital image 300 and the image mask portion 322b corresponding to the defined boundary region optimizes an image segmentation for a hard boundary of the digital image 300. FIG. 3 illustrates that the mask generation system 102 uses the boundary information corresponding to the blended boundary region and the defined boundary region to generate a final image mask. In particular, the mask generation system 102 utilizes a merging layer 340 to combine the image mask portion 322a corresponding to the blended boundary region with the image mask portion 322b corresponding to the defined boundary region.

In one or more embodiments, the merging layer 340 combines the two image mask portions based on a position of each image mask portion relative to the digital image 300. For example, the mask generation system 102 determines a coordinate system for the digital image 300. At each stage in each neural network, the mask generation system 102 tracks the coordinate system of each cropped image before and after downsampling or upsampling, for example, by converting the coordinate system(s) at each step. The mask generation system 102 then uses the tracked coordinate system information to determine how to combine the image mask portions and generate an image mask 342. Furthermore, in one or more embodiments, the mask generation system 102 combines the image mask 342 with one or more additional image mask portions corresponding to the remaining portions of the digital image 300, such as an image mask portion corresponding to a portion of the digital image 300 outside the areas of the cropped digital images.

As described above, the mask generation system 102 downsamples and upsamples a digital image at various stages of the mask generation process. In one or more embodiments, resizing a digital image to one or more resolution sizes improves the accuracy of the resulting image mask. For example, in some embodiments the neural network layers more accurately identify specific details at certain resolutions (e.g., based on the learned parameters of the neural networks). Additionally, in some embodiments, the neural network layers can more efficiently process digital images by setting the resolution of each processed image to predetermined resolution sizes (e.g., lower resolution sizes), which reduces computer processing requirements.

Figure 4:
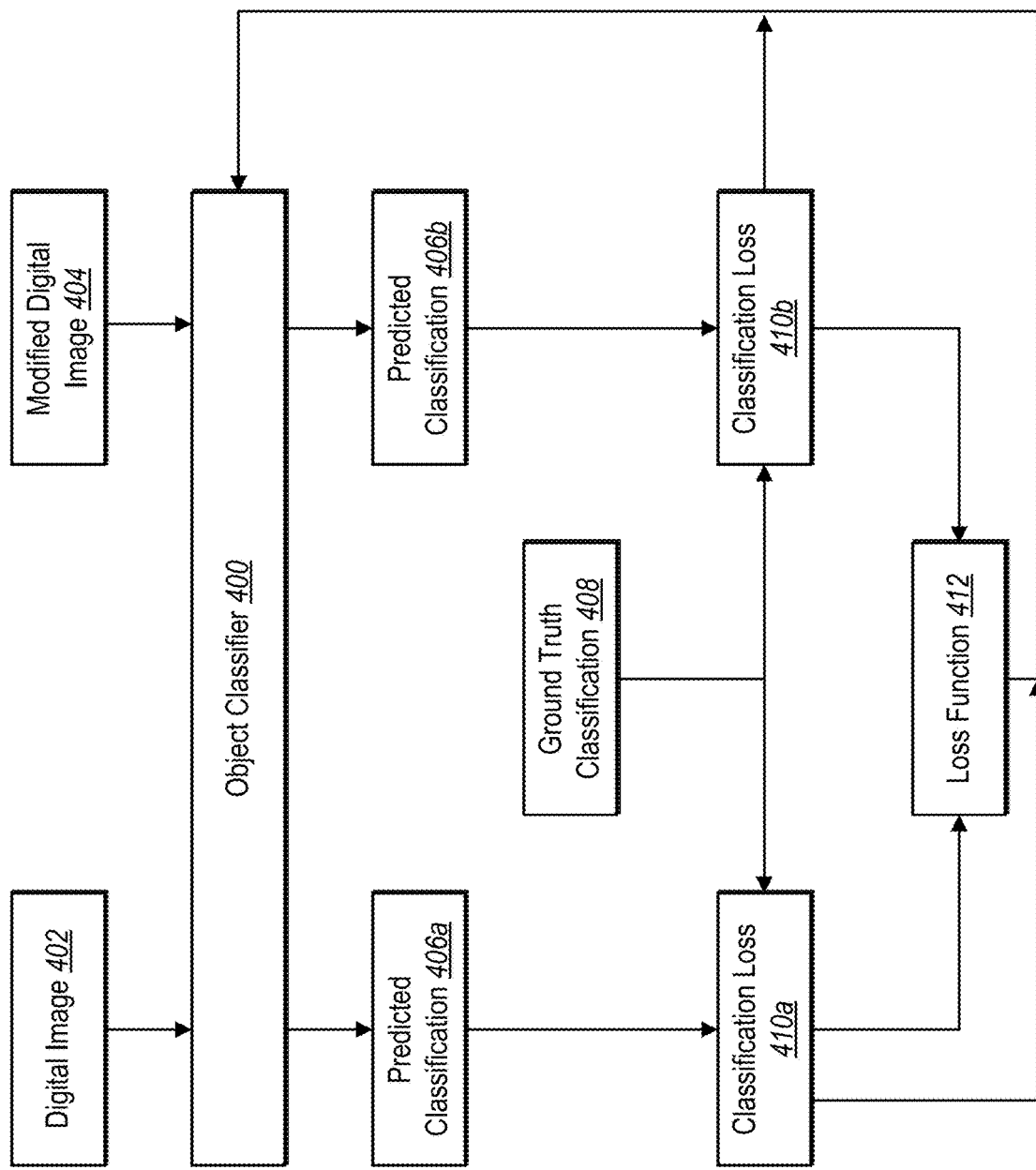
FIG. 4 illustrates a diagram of learning parameters of an object classifier in accordance with one or more implementations.

As mentioned previously, in one or more embodiments, the mask generation system 102 trains an object classifier to classify digital images based on objects in the digital images. FIG. 4 illustrates an embodiment in which the mask generation system 102 learns parameters of an object classifier 400 by augmenting a dataset of digital images. For example, FIG. 4 illustrates that the mask generation system 102 utilizes a digital image 402 (e.g., a digital image including an object) as an input to the object classifier 400. Additionally, the mask generation system 102 augments a dataset including the digital image 402 by generating a modified digital image 404. The mask generation system 102 then utilizes the digital image 402 and the modified digital image 404 to learn parameters of the object classifier 400.

In one or more embodiments, the mask generation system 102 generates the modified digital image 404 from the digital image 402 by modifying one or more visual characteristics of the digital image 402. For example, the mask generation system 102 randomly shuffles values in the color channels (e.g., color channels in the RGB, HSV, HSL, or CIELAB color spaces) or gamma values (e.g., randomly selected from [0.2, 2]). Additionally, in one or more embodiments, the mask generation system 102 further modifies the digital image 402 by adding linear contrast to the color channels. In various embodiments, the mask generation system 102 also utilizes random scaling of the digital image 402 (e.g., using bilinear or nearest neighbor scaling), compression to introduce various noise levels (e.g., based on different compression algorithms such as JPEG compression), and/or various interpolation methods to modify visual aspects of the digital image 402 while retaining visual information about the object and the object boundaries in the digital image 402. In some embodiments, the mask generation system 102 also randomly flips or rotates images (e.g., 90 degrees, 180 degrees, 270 degrees). In this manner, the mask generation system 102 modifies the digital image 402 to generate one or more modified versions of the digital image 402 (e.g., the modified digital image 404) and other digital images in a training dataset to augment the dataset. By generating a plurality of digital images from a single digital image to augment the dataset, the mask generation system 102 can significantly reduce the amount of input data (e.g., unique digital images) and ground truth information required to train the object classifier 400.

FIG. 4 illustrates that, for each of the digital image 402 and the modified digital image 404, the mask generation system 102 generates a predicted classification using the object classifier 400. For example, the object classifier 400 generates a first predicted classification 406a corresponding to the digital image 402 and a second predicted classification 406b corresponding to the modified digital image 404. In one or more embodiments, the object classifier 400 generates the predicted classifications in response to determining whether each digital image includes a person or a non-person object. Thus, the predicted classifications can include a portrait image classification or a non-portrait image classification.

In response to the object classifier 400 generating the first predicted classification 406a and the second predicted classification 406b based on the digital image 402 and the modified digital image 404, respectively, the mask generation system 102 determines an accuracy of the object classifier 400. Specifically, FIG. 4 illustrates that the mask generation system 102 compares the first predicted classification 406a and the second predicted classification 406b to a ground-truth classification 408. Because the modified digital image 404 includes the same object as the digital image 402, the ground-truth classification 408 is the same for the digital image 402 and the modified digital image 404.

Based on the comparison between the first predicted classification 406a and the ground-truth classification 408, the mask generation system 102 determines a first classification loss 410a corresponding to the digital image 402. Additionally, based on the comparison between the second predicted classification 406b and the ground-truth classification 408, the mask generation system 102 determines a second classification loss 410b corresponding to the modified digital image 404. Because the digital image 402 and the modified digital image 404 include the same object, the resulting classification losses should be the same. To ensure that the classification losses are the same, the mask generation system 102 utilizes a loss function 412 that compares the first classification loss 410a to the second classification loss 410b.

The mask generation system 102 utilizes the loss function 412 to determine any difference between the classification losses. The mask generation system 102 then provides the resulting comparison loss from the loss function 412 to the object classifier 400. Additionally, the mask generation system 102 provides each of the first classification loss 410a and the second classification loss 410b to the object classifier 400 with the loss from the loss function 412. The mask generation system 102 thus trains the object classifier 400 by learning parameters of the object classifier 400 so that the object classifier 400 returns the same classification for both the digital image 402 and the modified digital image 404. By training the object classifier 400 based on the comparison loss from the loss function 412, the mask generation system 102 improves the accuracy and performance of the object classifier 400 (e.g., to more accurately determine whether digital images include people or non-person objects).

Figure 5A:
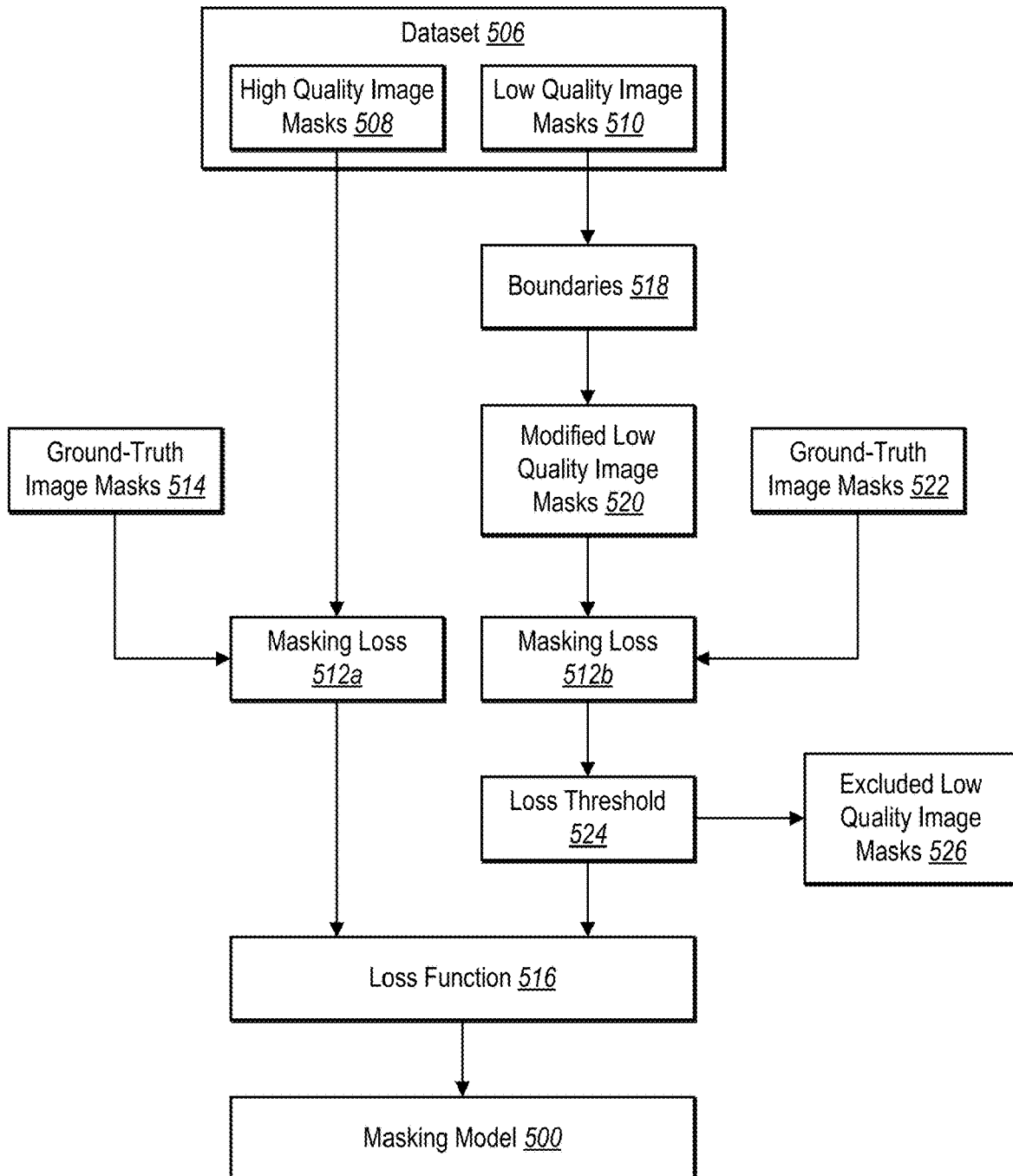
FIG. 5A illustrates a diagram of learning parameters of a masking model in accordance with one or more implementations.
Figure 5C:
FIGS. 5B-5C illustrate diagrams of a digital image and a corresponding low-quality image mask in accordance with one or more implementations.
Figure 5B:

In one or more embodiments, the mask generation system 102 also learns parameters of a masking model (e.g., the masking models described above with respect to FIGS. 2 and 3). For example, FIG. 5A illustrates the mask generation system 102 learning parameters of a masking model 500. FIGS. 5B and 5C illustrate a digital image 502 and a corresponding low quality image mask 504. Specifically, the low quality image mask 504 represents a low-quality image mask, which is an image mask that has inaccurate boundary details due to a complex background in the source image, semantic error, or missing object details. As described below, the mask generation system 102 processes low-quality image masks to remove training data that degrades the training quality of the masking model 500.

For example, FIG. 5A illustrates a dataset 506 including a plurality of high quality image masks 508 corresponding to a first group of digital images and a plurality of low quality image masks 510 corresponding to a second group of digital images. In one or more embodiments, the dataset 506 includes the high quality image masks 508 and the low quality image masks 510 to improve different aspects of the masking model 500. For example, the high quality image masks 508 improve the ability of the masking model 500 to identify boundary details in digital images, while the low quality image masks 510 improve the ability of the masking model 500 to detect more varied semantic differences.

The mask generation system 102 utilizes the masking model 500 to determine a first masking loss 512a associated with the high quality image masks 508 and a second masking loss 512b associated with the low quality image masks 510. To illustrate, the mask generation system 102 determines the first masking loss 512a by comparing the high quality image masks 508 to ground-truth image masks 514 for the digital images in the first group. The mask generation system 102 can utilize the first masking loss 512a for the high quality image masks 508 as a first component of a final masking loss 516 for learning parameters of the masking model 500.

To determine a second portion of the final masking loss 516 (e.g., the second masking loss 512b for the low quality image masks 510), the mask generation system 102 first determines boundaries 518 for the low quality image masks 510. In particular, the mask generation system 102 generates masks corresponding to the boundaries 518 of the digital images in the second group. The mask generation system 102 then removes the boundaries 518 from the low quality image masks 510 using the generated masks to generate modified low quality image masks 520. The mask generation system determines the second masking loss 512b by comparing the modified low quality image masks 520 to ground-truth image masks 522 for the digital images in the second group. The second masking loss 512b thus excludes the boundary details from the low quality image masks 510 to avoid degrading performance of the masking model 500.

FIG. 5A further illustrates that the mask generation system 102 determines one or more low quality image masks to exclude from the dataset 506 for training the masking model 500. In one or more embodiments, the mask generation system 102 identifies one or more low quality image masks 510 that have masking losses that exceed a loss threshold 524. Specifically, the low quality image masks 510 with losses that exceed the loss threshold 524 indicate poor semantic performance that may result in degraded performance of the masking model 500 if used in training. Thus, the mask generation system 102 can compare the second masking loss 512b to the loss threshold 524 to determine excluded low quality image masks 526 to remove from the dataset 506. In one or more embodiments, the loss threshold has a value of 0.4 on a scale of 0 to 1, such that low quality image masks with masking losses higher than 0.4 are excluded. In other embodiments, the loss threshold includes a value higher or lower than 0.4, depending on the particular implementation, detected objects, image quality, etc.

After determining the second masking loss 512b and excluding any low quality image masks from the dataset 506, the mask generation system 102 learns parameters of the masking model 500 by utilizing the final masking loss 516. In particular, the final masking loss 516 includes high quality boundary details from the first masking loss 512a (e.g., due to the boundary data from the high quality image masks) and varied semantic data from the second masking loss 512b (e.g., non-boundary object data) while excluding boundary details from the second masking loss 512b. Specifically, the final masking loss 516 improves boundary detection of the masking model 506 by excluding poor boundary details of the low quality image masks from the second masking loss 512b but improves semantic detection by including a larger variety of object data at low resolutions 512b. The mask generation system 102 utilizes the final masking loss 516 to learn parameters of the masking model 500. In one or more embodiments, the mask generation system 102 determines the final masking loss 516 as:

$$L = L_{high}(\text{output}, \text{target}) + L_{low}(\text{output} * \text{mask}, \text{target} * \text{mask})$$

In one or more embodiments, the mask generation system 102 performs hard-case removal by first training the masking model 506 with a large dataset of digital images (e.g., 100,000 digital images) with the boundary masking loss. The mask generation system 102 then leverages the pre-trained masking model 506 to perform inference on the training dataset and determine the loss L above for each digital image. In one or embodiments, if the loss for a digital image is larger than 0.4, the mask generation system 102 removes the digital image from the training dataset. The mask generation system 102 then re-trains the masking model 506 based on the updated/cleaned training dataset. By training the masking model 506 based on the cleaned training dataset and masking losses, the mask generation system 102 improves the accuracy of the masking model 506 in identifying object boundaries, which results in more accurate image masks generated by the masking model 506.

As noted, FIGS. 5B and 5C illustrate an example digital image 502 and a corresponding low quality image mask 504. In one or more embodiments, the mask generation system 102 determines that a masking loss associated with the low quality image mask 504 exceeds the loss threshold due to missing semantic information (e.g., the low quality image mask 504 excludes the dog from the digital image 502 from the foreground region). Accordingly, the mask generation system 102 excludes the digital image 502 from the dataset 506 for learning parameters of the masking model 500.

In one or more embodiments, the mask generation system 102 also learns parameters of each neural network layer in the image mask generation pipeline based on one or more datasets of digital images with different sizes. For example, the mask generation system 102 crops training images in the dataset(s) to various resolution sizes (e.g., 480×480, 640×640). The mask generation system 102 then resizes the cropped training images to a smaller resolution size (e.g., 320×320). By resizing the images to the smaller resolution size, the mask generation system 102 improves the robustness of the neural network layers to learning better context and semantics of images of varied scales. In some embodiments, the mask generation system 102 also uses data augmentation methods described previously with respect to the object classifier to augment datasets for training one or more other neural network layers in the mask generation pipeline.

FIGS. 6A-6J illustrate images and image masks in a process for generating an image mask from a digital image. Specifically, FIGS. 6A-6J illustrate that the mask generation system 102 generates separate mask portions for hard boundaries and soft boundaries of the digital image and then combines the separate mask portions into a final image mask. For example, the mask generation system 102 utilizes a first neural network to generate a mask portion corresponding to the hard boundaries and a second neural network to generate a mask portion corresponding to the soft boundaries.

Figure 6B:
Figure 6A:
Figure 6D:
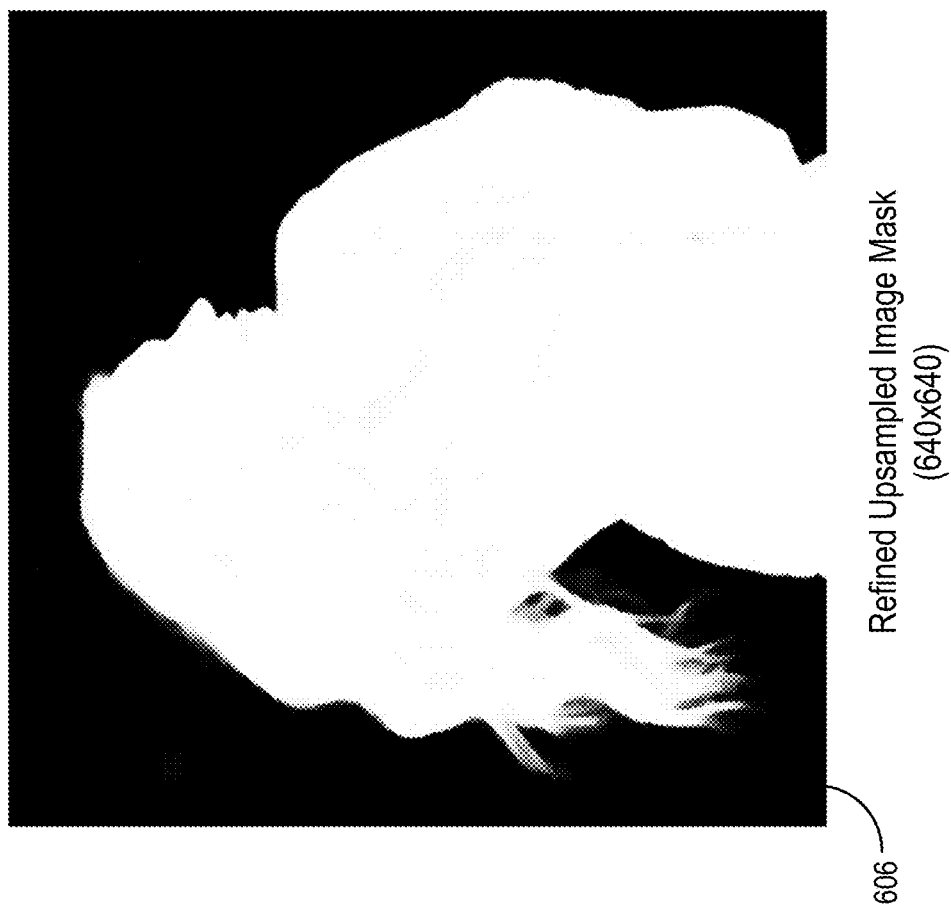

As illustrated in FIG. 6A, a digital image 600 includes a person against a background. In one or more embodiments, the mask generation system 102 first classifies the digital image 600 by utilizing an object classifier to recognize the object in the digital image 600 as a person. In response to determining that the digital image 600 includes a person, the object classifier classifies the digital image 600 as a portrait image. Furthermore, FIG. 6B illustrates that the mask generation system 102 utilizes a semantic cropping neural network to generate a cropped digital image 602 to a portion of the digital image 600 that includes the person.

In one or more embodiments, the mask generation system 102 provides the cropped digital image 602 to a first neural network to generate an image mask based on hard boundaries in the cropped digital image 602. Specifically, the mask generation system 102 first downsamples the cropped digital image 602 and modifies an aspect ratio of the cropped digital image 602 to a first resolution size (e.g., a 320×320 resolution size). The mask generation system 102 provides the resized version of the cropped digital image 602 to the masking model. The masking model then generates an initial image mask for the cropped digital image 602 based on a defined boundary region detected by the masking model from the cropped digital image 602.

Figure 6C:
Figure 6J:

After generating the initial image mask, the mask generation system 102 upsamples the generated image mask. In particular, FIG. 6C illustrates an upsampled image mask 604 based on the initial image mask. For example, the mask generation system 102 upsamples the image mask from the masking model to a second resolution size (e.g., a 640×640 resolution size). The mask generation system 102 then provides the upsampled image mask 604 to a refinement model to reduce noise and artifacts introduced by the masking model and/or resizing. Specifically, the refinement model refines details of the image mask, resulting in a refined upsampled image mask (i.e., a first mask portion 606), which the mask generation system 102 uses to determine a mask portion for the hard boundary details of the digital image 600.

FIGS. 6E-6I illustrate digital images and image masks in connection with a process for generating a mask portion corresponding to soft boundary details of the digital image 600. In one or more embodiments, the mask generation system 102 resizes the cropped digital image 602 of FIG. 6B to a specific resolution size. For example, the mask generation system 102 resizes the cropped digital image 602 to a 320×320 resolution size, indicated by the resized cropped digital image 608 of FIG. 6E.

In one or more embodiments, the mask generation system 102 uses the resized cropped digital image 608 as an input to a trimap generation neural network. The trimap generation neural network generates a prediction of a blended boundary region corresponding to the soft boundary details from the resized cropped digital image 608. As illustrated in FIG. 6F, the trimap generation neural network generates a prediction 610 including a blended boundary region corresponding to pixels of the resized cropped digital image 608 that include both foreground information and background information. Specifically, the blended boundary region corresponds to soft hair details at a boundary between the person and the background in the resized cropped digital image 602.

In addition to generating the prediction 610 of the blended boundary region, in one or more embodiments, the trimap generation neural network crops the prediction 610 to the blended boundary region. FIG. 6G illustrates the cropped prediction 612 of the trimap generation neural network. In particular, the trimap generation neural network generates the cropped prediction 612 to focus on the blended boundary region. Thus, even if the predicted region occupies a small portion of the input image to the trimap generation neural network, the trimap generation neural network outputs a detailed trimap segmentation.

FIG. 6H illustrates a trimap segmentation 614 based on the resized cropped digital image 608, and further based on the cropped prediction 612. For example, the trimap generation neural network generates the trimap segmentation 614 by determining a foreground region (indicated by the white portion of the trimap segmentation 614). The trimap generation neural network also determines a background region (indicated by the black portion of the trimap segmentation 614). Furthermore, the trimap generation neural network determines the blended boundary region (indicated by the gray portion of the trimap segmentation 614) to combine with the foreground region and the background region. For example, the trimap generation neural network converts the cropped prediction 612 to the blended boundary region in the trimap segmentation 614 by detecting each pixel comprising a non-zero value in the cropped prediction 612 and assigning the detected pixels to the blended boundary region.

After the trimap generation neural network generates the trimap segmentation 614, the mask generation system 102 provides the trimap segmentation 614 to a matting model. FIG. 6I illustrates a second mask portion 616 generated by a matting model based on the trimap segmentation 614. In particular, the mask generation system 102 first resizes the trimap segmentation 614 and the resized cropped digital image by upsampling to a higher resolution (e.g., 640×640). The mask generation system 102 then utilizes the matting model to generate the second mask portion 616 by processing the upsampled digital image based on the information in the upsampled trimap segmentation to determine alpha values for each pixel of the second mask portion. For instance, the alpha values for the background region indicate full transparency (e.g., 0 values in the second mask portion), for the foreground region indicate full opacity (e.g., 1 values in the second mask portion), and for the blended region to indicate some transparency (e.g., values between 0 and 1 in the second mask portion).

In response to determining the second mask portion 616 for the blended boundary, the mask generation system 102 upsamples the second mask portion corresponding to the blended boundary region and the first mask portion 606 corresponding to the defined boundary portion to the full resolution of the digital image 600. The mask generation system 102 merges the upsampled mask portions for each of the boundary regions to generate a combined image mask for the defined boundary region and the blended boundary region. In one or more embodiments, the mask generation system 102 combines the mask portions based on the positions of the portions relative to the digital image 600.

According to one or more embodiments, the mask generation system 102 replaces a portion of the first mask portion 606 corresponding to the blended boundary region with the corresponding portion from the second mask portion 616. Alternatively, the mask generation system replaces a portion of the second mask portion 616 corresponding to the defined boundary region with the corresponding portion from the first mask portion 606. Additionally, in one or more embodiments, the mask generation system 102 generates a final image mask 618, illustrated in FIG. 6J, by joining the combined image mask with an image mask for the remaining portions of the digital image 600. Alternatively, the mask generation system expands the edges of the combined image mask to the edges of the digital image 600 based on the positions of the portions relative to the digital image 600.

As described in relation to FIGS. 2-3 and 6A-6J, the mask generation system 102 performs operations for utilizing a multi-branch pipeline to generate image masks for digital images and to separately process hard boundary details and soft boundary details within a single digital image. The operations allow the mask generation system 102 to accurately generate image masks for digital images depending on the boundaries of objects within the digital images. Accordingly, the acts and operations illustrated and described above in relation to FIGS. 2-3, and 6A-6J can provide the corresponding acts (e.g., structure) for a step for determining separate mask portions based on the defined boundary region and the blended boundary region. The acts and operations illustrated and described above in relation to FIGS. 2-3, and 6A-6J can also provide corresponding acts (e.g., structure) for a step for automatically generating a trimap segmentation of the digital image.

Figure 7:
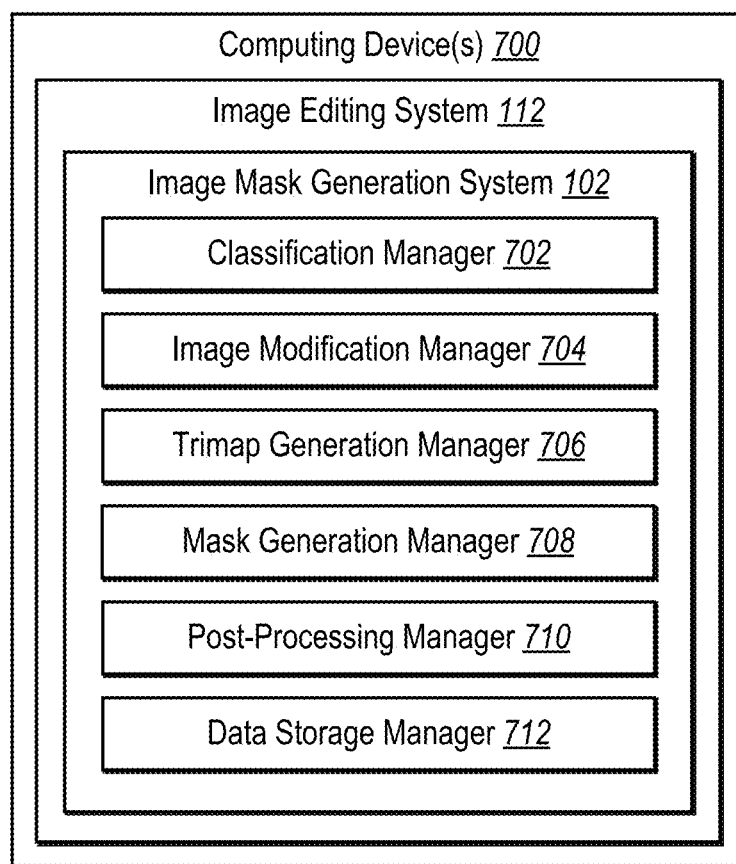
FIG. 7 illustrates a diagram of a computing device implementing the image mask generation system of FIG. 1 and corresponding components in accordance with one or more implementations.

FIG. 7 illustrates a detailed schematic diagram of an embodiment of the image mask generation system 102 described above. As shown, the mask generation system 102 is implemented in an image editing system 110 on computing device(s) 700 (e.g., a client device and/or server device as described in FIG. 1, and as further described below in relation to FIG. 10). Additionally, in one or more embodiments, the mask generation system 102 includes, but is not limited to, a classification manager 702, an image modification manager 704, a trimap generation manager 706, a mask generation manager 708, a post-processing manager 710, and a data storage manager 712. The mask generation system 102 can be implemented on any number of computing devices. In one or more embodiments, the mask generation system 102 is implemented in a distributed system of server devices for subdividing and rendering three-dimensional meshes. In alternative embodiments, the mask generation system 102 is implemented within one or more additional systems. Alternatively, the mask generation system 102 may be implemented on a single computing device such as a single client device.

In one or more embodiments, each of the components of the mask generation system 102 is in communication with other components using any suitable communication technologies. Additionally, in some embodiments, the components of the mask generation system 102 are in communication with one or more other devices including other computing devices of a user, server devices (e.g., cloud storage devices), licensing servers, or other devices/systems. It will be recognized that although the components of the mask generation system 102 are shown to be separate in FIG. 7, any of the subcomponents may be combined into fewer components, such as into a single component, or divided into more components as may serve a particular implementation. Furthermore, although the components of FIG. 7 are described in connection with the mask generation system 102, in one or more embodiments, at least some of the components for performing operations in conjunction with the mask generation system 102 described herein are implemented on other devices within the environment.

In some embodiments, the components of the mask generation system 102 include software, hardware, or both. For example, the components of the mask generation system 102 include one or more instructions stored on a computer-readable storage medium and executable by processors of one or more computing devices (e.g., the computing device(s) 700). When executed by the one or more processors, the computer-executable instructions of the mask generation system 102 can cause the computing device(s) 700 to perform the mask generation operations described herein. Alternatively, the components of the mask generation system 102 can include hardware, such as a special purpose processing device to perform a certain function or group of functions. Additionally, or alternatively, the components of the mask generation system 102 can include a combination of computer-executable instructions and hardware.

Furthermore, the components of the mask generation system 102 performing the functions described herein with respect to the mask generation system 102 may, for example, be implemented as part of a stand-alone application, as a module of an application, as a plug-in for applications, as a library function or functions that may be called by other applications, and/or as a cloud-computing model. Thus, the components of the mask generation system 102 may be implemented as part of a stand-alone application on a personal computing device or a mobile device. Alternatively, or additionally, the components of the mask generation system 102 may be implemented in any application that provides three-dimensional image rendering, including, but not limited to ADOBE® PHOTOSHOP®, LIGHTROOM® or CREATIVE CLOUD® software. "ADOBE", "PHOTOSHOP," "LIGHTROOM," AND "CREATIVE CLOUD" are either registered trademarks or trademarks of Adobe Inc. in the United States and/or other countries.

As described above, in some embodiments, the mask generation system 102 includes a classification manager 702. For example, the classification manager 702 includes an object classifier to classify digital images based on the content of the digital images. In some embodiments, the classification manager 702 classifies the digital images as portrait images or non-portrait images based on whether the digital images include people in a foreground position. In alternative embodiments, the classification manager 702 classifies digital images based on whether foreground objects include soft boundaries such as fur or hair.

In additional embodiments, the mask generation system 102 includes an image modification manager 704. The image modification manager 704 modifies digital images by cropping the digital images and/or resizing digital images in connection with one or more neural network layers in a mask generation process. For example, in some embodiments, the image modification manager 704 utilizes a semantic cropping neural network to crop digital images. In one or more embodiments, the image modification manager 704 also augments datasets for learning parameters of neural network layers by modifying color channels, scaling, compression, or other characteristics of digital images in the datasets.

FIG. 7 further illustrates that the mask generation system 102 includes a trimap generation manager 706. The trimap generation manager 706 includes a trimap generation neural network to generate trimap segmentations of digital images. Specifically, the trimap generation manager 706 utilizes the trimap generation neural network to predict blended boundary regions corresponding to soft boundaries of digital images. The trimap generation manager 706 utilizes the predicted blended boundary regions to generate trimap segmentations by combining the predicted blended boundary regions with estimated foreground regions and estimated background regions of the digital images.

In one or more embodiments, the mask generation system 102 further includes a mask generation manager 708 to generate image masks from digital images. In particular, the mask generation manager 708 includes a matting model that utilizes information from trimap segmentations to generate image masks for blended boundary regions. Additionally, the mask generation manager 708 includes a masking model that generates image masks for defined boundary regions. The mask generation system 102 also includes one or more neural network layers to generate image masks for non-portrait digital images.

FIG. 7 further illustrates that the mask generation system 102 includes a post-processing manager 710 to perform one or more post-processing operations on image masks. For example, the post-processing manager 710 includes one or more refinement models, one or more guided image filters, a binarization model, and/or a curve-fitting model to perform various post-processing operations on image masks based on the content of the corresponding digital images (e.g., based on the boundaries and/or based on the image classification). The post-processing manager 710 also merges image masks corresponding to blended boundary regions and defined boundary regions into final image masks for digital images.

Additionally, the mask generation system 102 also includes a data storage manager 702 (that comprises a non-transitory computer memory/one or more memory devices) that stores and maintains data associated with generating image masks. For example, the data storage manager 702 stores one or more neural networks (e.g., neural network layers associated with a plurality of branches of a mask generation pipeline). The data storage manager 702 also stores information associated with digital images, modified digital images, training datasets, trimap segmentations, and image masks at each stage in the pipeline.

Figure 8:
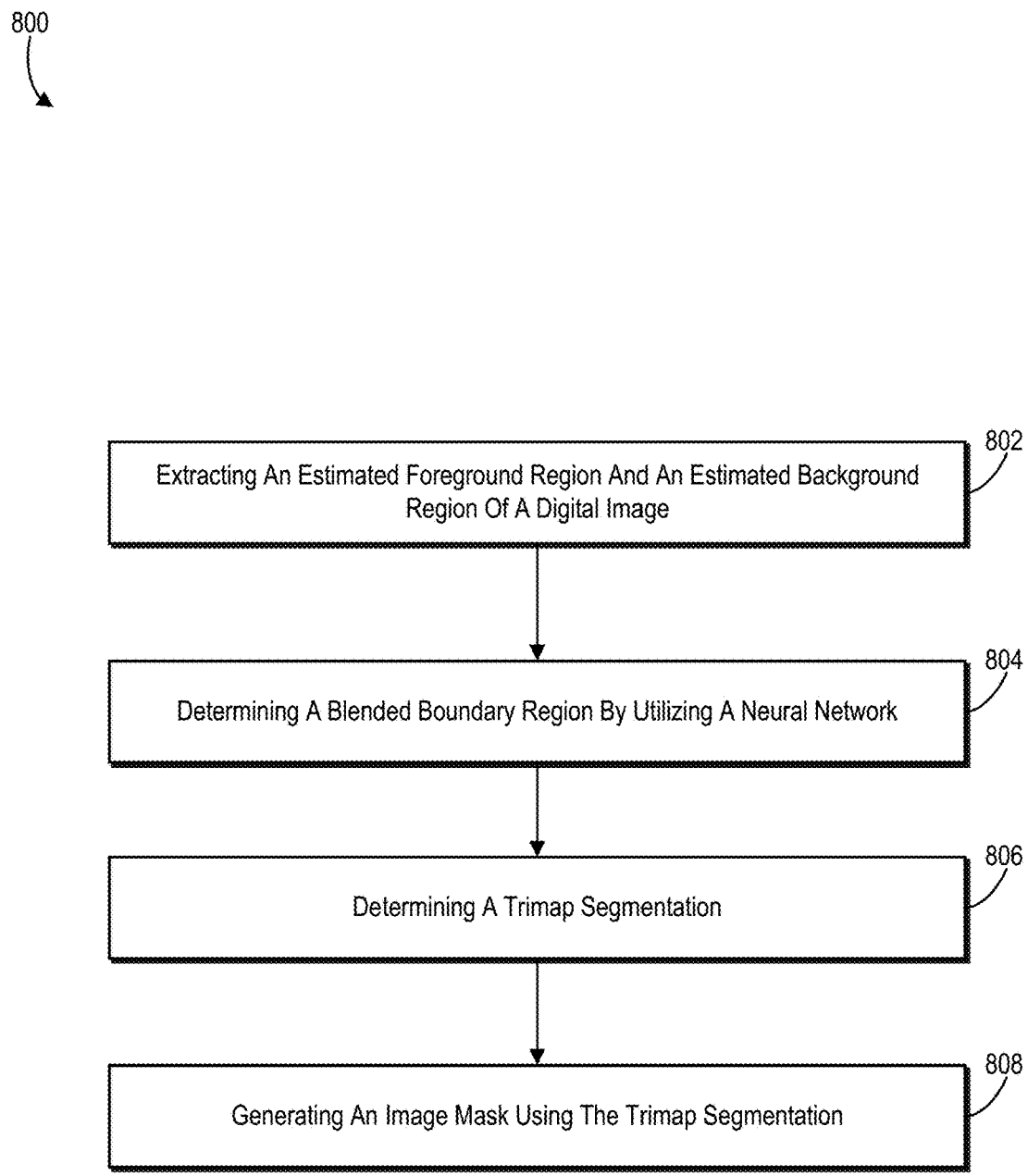
FIG. 8 illustrates a flowchart of a series of acts for generating an image mask based on an automatically generated trimap segmentation in accordance with one or more implementations.

Turning now to FIG. 8, this figure shows a flowchart of a series of acts 800 of automatically generating a trimap segmentation for a digital image in a mask generation process. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of extracting an estimated foreground region and an estimated background region of a digital image. For example, act 802 involves extracting an estimated foreground region and an estimated background region of a digital image, wherein the estimated foreground region portrays an object in the digital image.

In one or more embodiments, act 802 involves extracting the estimated foreground region and the estimated background region from the cropped digital image at a first resolution size. For example, in one or more embodiments, the first resolution size corresponds to a resolution size of digital images used to learn parameters of a neural network for generating an image mask for the digital image.

The series of acts 800 also include an act 804 of determining a blended boundary region by utilizing a neural network. For example, act 804 involves determining, utilizing a neural network, a blended boundary region of the object in the digital image, wherein the blended boundary region comprises a combination of foreground elements and background elements. According to some embodiments, act 804 involves determining that the blended boundary region comprises a plurality of pixels in the digital image that include foreground colors and background colors.

In one or more embodiments, act 804, or another act, involves utilizing a semantic cropping neural network to crop the digital image to a portion of the digital image including the object. For example, the series of acts 800 includes detecting, utilizing the semantic cropping neural network, the object within the portion of the digital image. The series of acts 800 then includes resizing the cropped digital image to the first resolution size. In some embodiments, the series of acts 800 (e.g., act 802) includes determining the estimated foreground region and the estimated background region from the cropped digital image at the first resolution size. Act 804 also involves determine, utilizing the neural network, the blended boundary region of the object from the cropped digital image at the first resolution size.

Additionally, the series of acts 800 includes an act 806 of determining a trimap segmentation. For example, act 806 involves determining a trimap segmentation of the digital image by combining the estimated foreground region, the estimated background region, and the blended boundary region.

In one or more embodiments, act 806 involves determining the trimap segmentation of the digital image by combining the estimated foreground region, the estimated background region, and the blended boundary region at the first resolution size. For example, act 806 then involves upsampling the cropped digital image and the trimap segmentation to a second resolution size. According to one or more embodiments, act 806 further involves utilizing a matting algorithm to generate the image mask from the upsampled cropped digital image and the upsampled trimap segmentation at the second resolution size. For example, act 806 involves generating the updated foreground region and the updated background region by utilizing the matting algorithm to assign an alpha value to each pixel within the blended boundary region based on the upsampled cropped digital image and the upsampled trimap segmentation at the second resolution size. In one or more embodiments, act 806 further involves utilizing the matting algorithm to generate an initial image mask at the second resolution size, and upsampling the initial image mask to an original resolution of the digital image.

Furthermore, the series of acts 800 includes an act 808 of generating an image mask using the trimap segmentation. For example, act 808 involves generating, utilizing the trimap segmentation of the digital image, an image mask for the digital image. According to one or more embodiments, act 808 involves utilizing a guided image filter to refine a boundary between an updated foreground region and an updated background region in the initial image mask. In one or more additional embodiments, act 808 involves generating an updated foreground region and an updated background region by assigning, utilizing the matting algorithm, alpha values to portions of the blended boundary region based on the trimap segmentation. For example, act 808 then involves generating the image mask based on the updated foreground region and the updated background region according to the assigned alpha values.

In one or more embodiments, act 808 involves combining the image mask with an additional image mask corresponding to an additional portion of the digital image based on an original position of the cropped digital image relative to the digital image. For example, act 808 involves combining the image mask with an image mask portion corresponding to a portion of the digital image outside the cropped digital image.

In one or more embodiments, the series of acts 800 includes generating, for a plurality of digital images, a plurality of predicted blended boundary regions corresponding to objects in the plurality of digital images. The series of acts 800 includes, for example, determining a blended boundary loss by comparing the plurality of predicted blended boundary regions and a plurality of ground-truth blended boundary regions for the plurality of digital images. Furthermore, the series of acts 800 includes learning parameters of the neural network based on the blended boundary loss.

Figure 9:
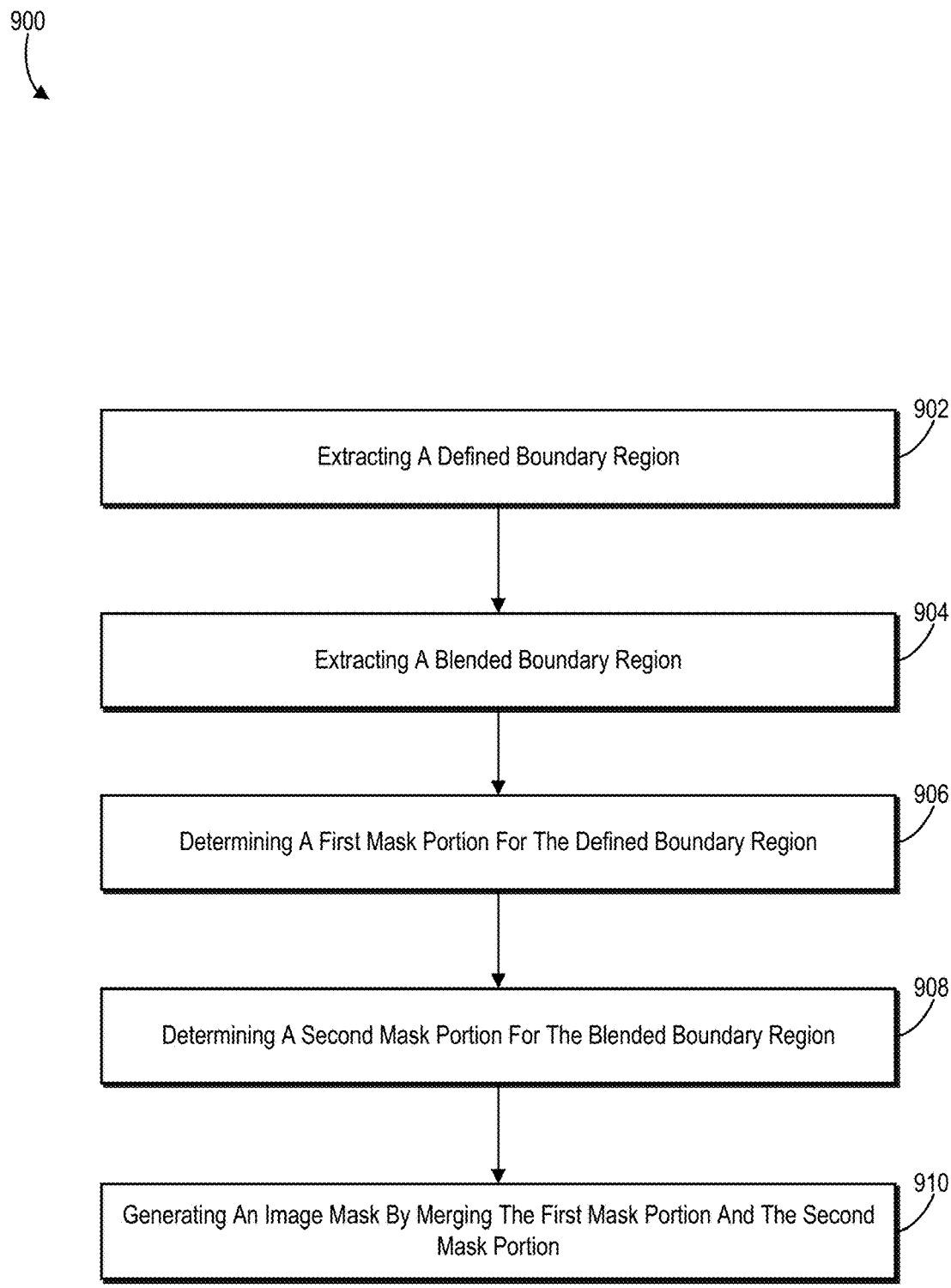
FIG. 9 illustrates a flowchart of a series of acts for generating an image mask in a multi-branch mask generation pipeline in accordance with one or more implementations.

Turning now to FIG. 9, this figure shows a flowchart of a series of acts 900 of utilizing separate neural networks to generate separate mask portions for a blended boundary region and a defined boundary region of a digital image. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of extracting a defined boundary region. For example, act 902 involves extracting a defined boundary region indicating a boundary between an estimated foreground region portraying an object of a digital image and an estimated background region of the digital image.

In one or more embodiments, as part of act 902, or as an additional act, the series of acts 900 includes classifying, utilizing an object classifier, the digital image into a portrait class in response to determining that the object comprises a person. Act 902 then involves extracting the defined boundary region and the blended boundary from the object in response to classifying the digital image into the portrait class. In additional embodiments, the series of acts 900 includes classifying, utilizing the object classifier, an additional digital image into a non-portrait class in response to determining that an additional object in the additional digital image comprises a non-person object. Furthermore, for example, the series of acts 900 includes generating, utilizing a third neural network, an additional image mask for the additional digital image comprising a boundary region for the additional object.

The series of acts 900 also includes an act 904 of extracting a blended boundary region. For example, act 904 involves extracting a blended boundary region of the object in the digital image, wherein the blended boundary region comprises a combination of foreground elements and background elements. In one or more embodiments, the blended boundary region corresponds to a portion of the digital image between a soft boundary of the object and a background in the digital image.

In one or more embodiments, act 904, or another act, involves utilizing a semantic cropping neural network to generate one or more cropped digital images comprising the defined boundary region and the blended boundary region. For example, act 904 then involves extracting the defined boundary region and the blended boundary region from the one or more cropped digital images. Additionally, in some embodiments, act 904 involves generating a first cropped digital image to a first portion of the digital image comprising the defined boundary region. Act 904 then involves generating a second cropped digital image to a second portion of the digital image comprising the blended boundary region.

In additional embodiments, act 904 involves resizing the one or more cropped digital images to a first resolution size. For example, in some embodiments, the first resolution size is smaller than an original resolution size of the digital image. In some embodiments, the first resolution size corresponds to a predetermined resolution size associated with one or more neural networks for generating an image mask of the digital image. Act 904 then involves extracting the estimated foreground region and the estimated background region from the one or more cropped digital images at the first resolution size.

Additionally, the series of acts 900 includes an act 906 of determining a first mask portion for the defined boundary region. For example, act 906 involves determining, utilizing a first neural network, a first mask portion corresponding to the defined boundary region. According to one or more embodiments, act 906 involves determining, utilizing the first neural network, the first mask portion corresponding to the defined boundary region from the one or more cropped digital images at a second resolution size, wherein the second resolution size is upsampled from the first resolution size.

The series of acts 900 further includes an act 908 of determining a second mask portion for the blended boundary region. For example, act 908 involves determining, utilizing a second neural network, a second mask portion corresponding to the blended boundary region. According to one or more embodiments, act 908 involves determining, utilizing the second neural network, the second mask portion corresponding to the blended boundary region from the one or more cropped digital images at the second resolution size.

The series of acts 900 also includes an act 910 of generating an image mask by merging the first mask portion and the second mask portion. For example, act 910 involves generating an image mask for the digital image by merging the first mask portion and the second mask portion. In some embodiments, act 910 involves upsampling the first mask portion and the second mask portion to an original resolution size of the digital image prior to merging the first mask portion and the second mask portion.

Additionally, in one or more embodiments, act 910 involves refining the first mask portion by utilizing a first guided image filter and refining the second mask portion by utilizing a second guided image filter. Act 910 then involves merging the refined first mask portion and the refined second mask portion according to a first position of the refined first mask portion and a second position of the refined second mask portion relative to the digital image. In one or more embodiments, act 910 also involves smoothing, utilizing a curve-fitting algorithm, a boundary of the refined first mask portion prior to merging the refined first mask portion and the refined second mask portion.

In one or more embodiments, the series of acts 900 includes augmenting a dataset of digital images by modifying, for a particular digital image in the dataset of digital images, a color channel or a scale of the particular digital image to generate a modified digital image. Additionally, for example, the series of acts 900 includes generating, utilizing the object classifier, a predicted classification for the particular digital image and an additional predicted classification for the modified digital image. Furthermore, the series of acts 900 includes determining a classification loss based on the predicted classification for the particular image and an additional classification loss based on the additional predicted classification for the modified digital image. The series of acts 900 then include learning parameters of the object classifier based on the classification loss and the additional classification loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
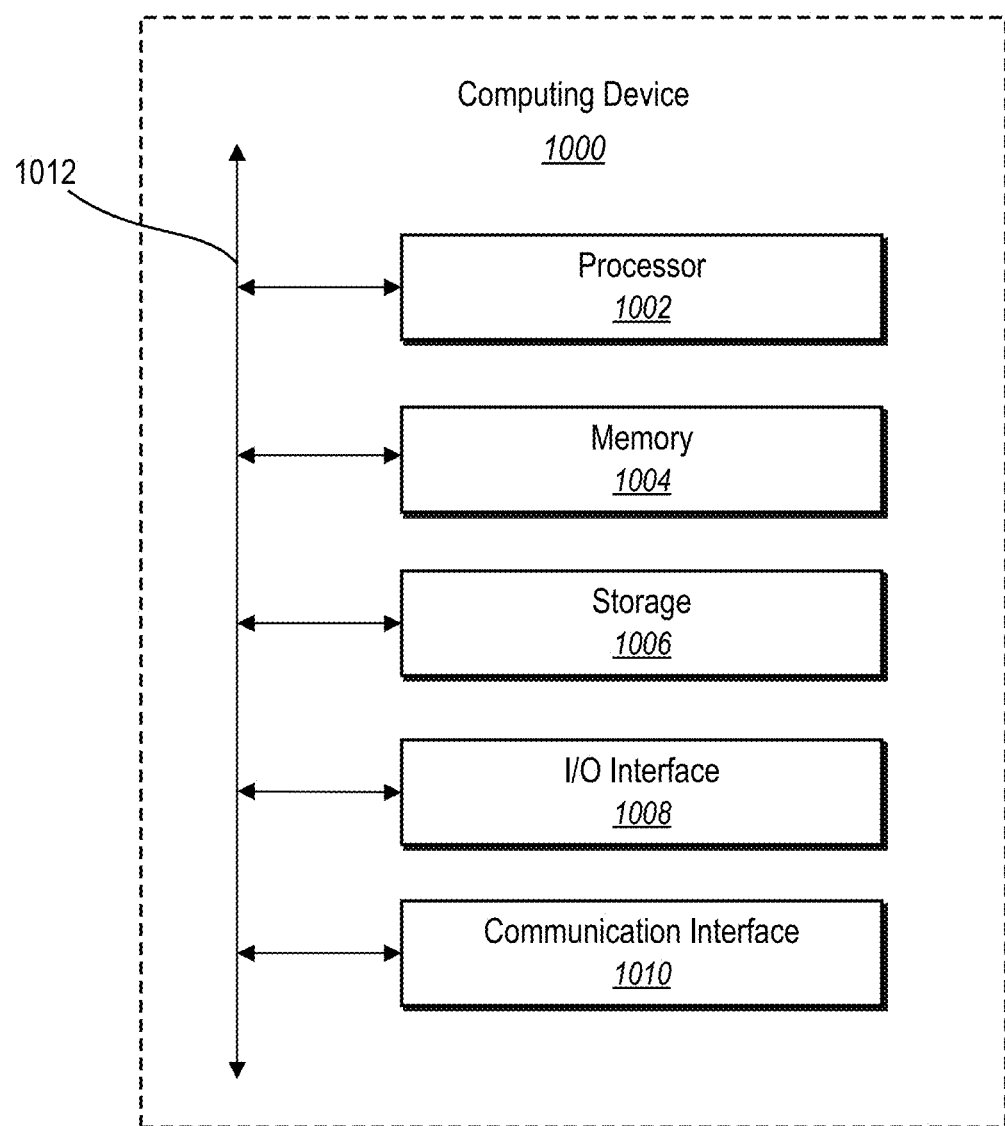
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    extract a defined boundary region indicating a boundary between an estimated foreground region portraying an object of a digital image and an estimated background region of the digital image;
    extract a blended boundary region of the object in the digital image, wherein the blended boundary region comprises pixels at the boundary between the estimated foreground region and the estimated background region that include a combination of foreground elements and background elements;
    determine, utilizing a first neural network, a first mask portion generated from the defined boundary region;
    determine, utilizing a second neural network, a second mask portion generated from a trimap segmentation including the blended boundary region; and
    generate an image mask for the digital image by merging the first mask portion and the second mask portion.

2. The non-transitory computer readable storage medium as recited in claim 1, further comprising instructions that, when executed by the at least one processor, cause the computing device to:
    utilize a semantic cropping neural network to generate one or more cropped digital images comprising the defined boundary region and the blended boundary region; and
    extract the defined boundary region and the blended boundary region from the one or more cropped digital images.

3. The non-transitory computer readable storage medium as recited in claim 2, further comprising instructions that, when executed by the at least one processor, cause the computing device to utilize the semantic cropping neural network to generate the one or more cropped digital images by:
  generating a first cropped digital image to a first portion of the digital image comprising the defined boundary region; and
  generating a second cropped digital image to a second portion of the digital image comprising the blended boundary region.

4. The non-transitory computer readable storage medium as recited in claim 2, further comprising instructions that, when executed by the at least one processor, cause the computing device to:
  resize the one or more cropped digital images to a first resolution size; and
  extract the estimated foreground region and the estimated background region from the one or more cropped digital images at the first resolution size.

5. The non-transitory computer readable storage medium as recited in claim 4, further comprising instructions that, when executed by the at least one processor, cause the computing device to:
  determine, utilizing the first neural network, the first mask portion generated from the defined boundary region from the one or more cropped digital images at a second resolution size, wherein the second resolution size is upsampled from the first resolution size; and
  determine, utilizing the second neural network, the second mask portion generated from the trimap segmentation including the blended boundary region from the one or more cropped digital images at the second resolution size.

6. The non-transitory computer readable storage medium as recited in claim 2, further comprising instructions that, when executed by the at least one processor, cause the computing device to generate the image mask for the digital image by upsampling the first mask portion and the second mask portion to an original resolution size of the digital image prior to merging the first mask portion and the second mask portion.

7. The non-transitory computer readable storage medium as recited in claim 2, further comprising instructions that, when executed by the at least one processor, cause the computing device to generate the image mask for the digital image by:
  refining the first mask portion by utilizing a first guided image filter;
  refining the second mask portion by utilizing a second guided image filter; and
  merging the refined first mask portion and the refined second mask portion according to a first position of the refined first mask portion and a second position of the refined second mask portion relative to the digital image.

8. The non-transitory computer readable storage medium as recited in claim 7, further comprising instructions that, when executed by the at least one processor, cause the computing device to smooth, utilizing a curve-fitting algorithm, a boundary of the refined first mask portion prior to merging the refined first mask portion and the refined second mask portion.

9. The non-transitory computer readable storage medium as recited in claim 1, further comprising instructions that, when executed by the at least one processor, cause the computing device to:
  classify, utilizing an object classifier, the digital image into a portrait class in response to determining that the object comprises a person; and
  extract the defined boundary region and the blended boundary region from the object in response to classifying the digital image into the portrait class.

10. The non-transitory computer readable storage medium as recited in claim 9, further comprising instructions that, when executed by the at least one processor, cause the computing device to:
  classify, utilizing the object classifier, an additional digital image into a non-portrait class in response to determining that an additional object in the additional digital image comprises a non-person object; and
  generate, utilizing a third neural network, an additional image mask for the additional digital image comprising a boundary region for the additional object.

11. A system comprising:
  at least one computer memory device comprising a digital image; and
  one or more servers configured to cause the system to:
    utilize a semantic cropping neural network to generate at least one cropped digital image by cropping the digital image to at least one portion of the digital image including an object;
    extract, from the at least one cropped digital image, a defined boundary region indicating a boundary between an estimated foreground region portraying the object and an estimated background region of the digital image;
    extract, from the at least one cropped digital image, a blended boundary region of the object, wherein the blended boundary region comprises pixels at the boundary between the estimated foreground region and the estimated background region that include a combination of foreground elements and background elements;
    determine, utilizing a first neural network, a first mask portion generated from the defined boundary region;
    determine, utilizing a second neural network, a second mask portion corresponding to the blended boundary region according to a trimap segmentation comprising the blended boundary region; and
    generate an image mask comprising a first boundary portion corresponding to the defined boundary region and a second boundary portion corresponding to the blended boundary region by merging the first mask portion and the second mask portion.

12. The system as recited in claim 11, wherein the one or more servers are further configured to cause the system to utilize the semantic cropping neural network to generate at least one cropped digital image by:
  utilizing the semantic cropping neural network to generate a first cropped digital image to a first portion of the digital image comprising the defined boundary region; and
  utilizing the semantic cropping neural network to generate a second cropped digital image to a second portion of the digital image comprising the blended boundary region.

13. The system as recited in claim 12, wherein the one or more servers are further configured to cause the system to:
  resize the first cropped digital image and the second cropped digital image to a first resolution size smaller than an original resolution size of the digital image;

extract the estimated foreground region and the estimated background region from the first cropped digital image; and extract the blended boundary region from the second cropped digital image by determining the pixels at the boundary between the estimated foreground region and the estimated background region that include the combination of foreground elements and background elements from the second cropped digital image at the first resolution size.

14. The system as recited in claim 11, wherein the one or more servers are further configured to cause the system to generate the image mask by:

refining, utilizing a first guided image filter, the first mask portion at an original resolution size of the digital image;

smoothing, utilizing a curve-fitting algorithm, a boundary of the refined first mask portion;

refining, utilizing a second guided image filter, the second mask portion at the original resolution size of the digital image; and merging the refined first mask portion comprising the smoothed boundary and the refined second mask portion.

15. The system as recited in claim 11, wherein the one or more servers are further configured to:

classify, utilizing an object classifier, the digital image into a portrait class in response to determining that the object comprises a person; and generate, based on the digital image belonging to the portrait class, the image mask comprising the first boundary portion corresponding to the defined boundary region and the second boundary portion corresponding to the blended boundary region.

16. The system as recited in claim 15, wherein the one or more servers are further configured to:

augment a dataset of digital images by modifying, for a particular digital image in the dataset of digital images, a color channel or a scale of the particular digital image to generate a modified digital image;

generate, utilizing the object classifier, a predicted classification for the particular digital image and an additional predicted classification for the modified digital image;

determine a classification loss based on the predicted classification for the particular digital image and an additional classification loss based on the additional predicted classification for the modified digital image; and learn parameters of the object classifier based on the classification loss and the additional classification loss.

17. The system as recited in claim 11, wherein the one or more servers are further configured to:

determine, for automatically generated image masks corresponding to digital images labeled as low quality images in a dataset of digital images, a plurality of boundaries within the automatically generated image masks;

determine a masking loss by comparing the automatically generated image masks to ground-truth image masks for the digital images labeled as low quality images and excluding the plurality of boundaries;

create a modified dataset by removing, in response to determining that the masking loss for the digital images exceeds a loss threshold, one or more digital images of the digital images labeled as low quality images from the dataset of digital images; and learn parameters of the first neural network based on the masking loss for digital images in the modified dataset.

18. A computer-implemented method comprising:

extracting a defined boundary region indicating a boundary between an estimated foreground region portraying an object of a digital image and an estimated background region of the digital image;

extracting a blended boundary region of the object in the digital image, wherein the blended boundary region comprises pixels at the boundary between the estimated foreground region and the estimated background region that include a combination of foreground elements and background elements;

performing a step for determining separate mask portions based on the defined boundary region and the blended boundary region; and generating an image mask for the digital image by merging the separate mask portions.

19. The computer-implemented method as recited in claim 18, further comprising:

utilizing a semantic cropping neural network to generate one or more cropped digital images comprising the defined boundary region and the blended boundary region;

downsampling the one or more cropped digital images to a first resolution size; and extracting the defined boundary region and the blended boundary region from the one or more cropped digital images at the first resolution size.

20. The computer-implemented method as recited in claim 18, further comprising:

classifying, utilizing an object classifier, the digital image into a portrait class in response to determining that the object comprises a person; and generating, based on the digital image belonging to the portrait class, the image mask comprising a first boundary portion corresponding to the defined boundary region and a second boundary portion corresponding to the blended boundary region.

* * * * *